US012726444B1

(12) United States Patent
Constantinou et al.

(10) Patent No.: US 12,726,444 B1
(45) Date of Patent: Sep. 1, 2026

(54) PER-EXECUTION NETWORK BANDWIDTH USE MONITORING IN A SERVERLESS CODE EXECUTION SYSTEM

(71) Applicant: Amazon Technologies, Inc., Seattle, WA (US)

(72) Inventors: Giorgos Constantinou, Seattle, WA (US); Prashant Kumar Singh, Seattle, WA (US); Jess Louis Lacy, Longmont, CO (US); Ravi S Nagayach, Aurora, IL (US); Dharani Sankar Vijayakumar, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 632 days.

(21) Appl. No.: 18/062,532

(22) Filed: Dec. 6, 2022

(51) Int. Cl.
*H04L 47/25* (2022.01)
*G06F 9/455* (2018.01)
(Continued)

(52) U.S. Cl.
CPC .......... *H04L 47/25* (2013.01); *G06F 9/45558* (2013.01); *G06F 9/50* (2013.01); *H04L 41/0896* (2013.01); *G06F 2009/45595* (2013.01)

(58) Field of Classification Search
CPC ....... G06F 9/45558; G06F 2009/45595; G06F 9/50; H04L 41/0896; H04L 47/25
(Continued)

(56) References Cited

U.S. PATENT DOCUMENTS 4,949,254 A 8/1990 Shorter
5,283,888 A 2/1994 Dao et al.
(Continued)

FOREIGN PATENT DOCUMENTS

CA 2975522 A1 8/2016
CN 1341238 A 3/2002
(Continued)

OTHER PUBLICATIONS

Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.

Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg.pdf [retrieved on Mar. 9, 2023] the whole document.
(Continued)

*Primary Examiner* — Jacob D Dascomb
(74) *Attorney, Agent, or Firm* — Knobbe, Martens, Olson & Bear, LLP

(57) ABSTRACT

Systems and methods are described for monitoring bandwidth use of code executed on a serverless execution environment on a per-execution basis. The code—which may correspond to a serverless function—is illustratively executed in an execution environment provided by a host computing device, which environment is configured to support a single execution of the function's code at a given time. Prior to an execution, the host computing device can initiate tracking of bandwidth use of the execution environment. The host computing device can then execute the code within the environment and, subsequent to such execution, finish tracking of the bandwidth use. The total bandwidth use observed based on tracking can then be reported as bandwidth use of the code execution.

20 Claims, 5 Drawing Sheets

(51) Int. Cl.
*G06F 9/50* (2006.01)
*H04L 41/0896* (2022.01)

(58) Field of Classification Search
USPC .............................................................. 718/1
See application file for complete search history.

(56) References Cited

U.S. PATENT DOCUMENTS 5,835,764 A 11/1998 Platt et al.
5,970,488 A 10/1999 Crowe et al.
5,983,197 A 11/1999 Enta
6,237,005 B1 5/2001 Griffin
6,260,058 B1 7/2001 Hoenninger et al.
6,385,636 B1 5/2002 Suzuki
6,463,509 B1 10/2002 Teoman et al.
6,501,736 B1 12/2002 Smolik et al.
6,523,035 B1 2/2003 Fleming et al.
6,549,936 B1 4/2003 Hirabayashi
6,708,276 B1 3/2004 Yarsa et al.
7,036,121 B1 4/2006 Casabona et al.
7,308,463 B2 12/2007 Taulbee et al.
7,340,522 B1 3/2008 Basu et al.
7,360,215 B2 4/2008 Kraiss et al.
7,558,719 B1 7/2009 Donlin
7,577,722 B1 8/2009 Khandekar et al.
7,590,806 B2 9/2009 Harris et al.
7,640,574 B1 12/2009 Kim et al.
7,665,090 B1 2/2010 Tormasov et al.
7,707,579 B2 4/2010 Rodriguez
7,730,464 B2 6/2010 Trowbridge
7,774,191 B2 8/2010 Berkowitz et al.
7,823,186 B2 10/2010 Pouliot
7,831,464 B1 11/2010 Nichols et al.
7,870,153 B2 1/2011 Croft et al.
7,886,021 B2 2/2011 Scheifler et al.
7,949,677 B2 5/2011 Croft et al.
7,954,150 B2 5/2011 Croft et al.
8,010,679 B2 8/2011 Low et al.
8,010,990 B2 8/2011 Ferguson et al.
8,024,564 B2 9/2011 Bassani et al.
8,046,765 B2 10/2011 Cherkasova et al.
8,051,180 B2 11/2011 Mazzaferri et al.
8,051,266 B2 11/2011 DeVal et al.
8,065,676 B1 11/2011 Sahai et al.
8,065,682 B2 11/2011 Baryshnikov et al.
8,095,931 B1 1/2012 Chen et al.
8,117,356 B1 * 2/2012 Narad .................... H04L 45/60 710/22
8,127,284 B2 2/2012 Meijer et al.
8,146,073 B2 3/2012 Sinha
8,166,304 B2 4/2012 Murase et al.
8,171,473 B2 5/2012 Lavin
8,201,026 B1 6/2012 Bornstein et al.
8,209,695 B1 6/2012 Pruyne et al.
8,219,987 B1 7/2012 Vlaovic et al.
8,296,267 B2 10/2012 Cahill et al.
8,321,554 B2 11/2012 Dickinson
8,321,558 B1 11/2012 Sirota et al.
8,336,079 B2 12/2012 Budko et al.
8,352,608 B1 1/2013 Keagy et al.
8,387,075 B1 2/2013 McCann et al.
8,392,558 B1 3/2013 Ahuja et al.
8,402,514 B1 3/2013 Thompson et al.
8,417,723 B1 4/2013 Lissack et al.
8,429,282 B1 4/2013 Ahuja
8,448,165 B1 5/2013 Conover
8,479,195 B2 7/2013 Adams et al.
8,490,088 B2 7/2013 Tang
8,495,631 B2 * 7/2013 Waldspurger ....... G06F 9/45558 718/1
8,555,281 B1 10/2013 Van Dijk et al.
8,560,699 B1 10/2013 Theimer et al.
8,566,835 B2 10/2013 Wang et al.
8,601,323 B2 12/2013 Tsantilis
8,613,070 B1 12/2013 Borzycki et al.
8,615,589 B1 12/2013 Adogla et al.
8,631,130 B2 1/2014 Jackson
8,667,471 B2 3/2014 Wintergerst et al.
8,677,359 B1 3/2014 Cavage et al.
8,694,996 B2 4/2014 Cawlfield et al.
8,700,768 B2 4/2014 Benari
8,713,093 B1 4/2014 Upadhyay et al.
8,719,415 B1 5/2014 Sirota et al.
8,725,702 B1 5/2014 Raman et al.
8,756,322 B1 6/2014 Lynch
8,756,696 B1 6/2014 Miller
8,763,091 B1 6/2014 Singh et al.
8,769,519 B2 7/2014 Leitman et al.
8,793,676 B2 7/2014 Quinn et al.
8,799,236 B1 8/2014 Azari et al.
8,799,879 B2 8/2014 Wright et al.
8,806,266 B1 8/2014 Qu et al.
8,806,468 B2 8/2014 Meijer et al.
8,806,644 B1 8/2014 McCorkendale et al.
8,819,679 B2 8/2014 Agarwal et al.
8,825,863 B2 9/2014 Hansson et al.
8,825,964 B1 9/2014 Sopka et al.
8,839,035 B1 9/2014 Dimitrovich et al.
8,850,432 B2 9/2014 Mcgrath et al.
8,869,300 B2 10/2014 Singh et al.
8,874,952 B2 10/2014 Tameshige et al.
8,904,008 B2 12/2014 Calder et al.
8,949,457 B1 2/2015 Theroux et al.
8,966,495 B2 2/2015 Kulkarni
8,972,980 B2 3/2015 Banga et al.
8,990,807 B2 3/2015 Wu et al.
8,997,093 B2 3/2015 Dimitrov
9,002,871 B2 4/2015 Bulkowski et al.
9,021,501 B2 4/2015 Li et al.
9,026,658 B2 5/2015 Xu et al.
9,027,087 B2 5/2015 Ishaya et al.
9,038,068 B2 5/2015 Engle et al.
9,052,935 B1 6/2015 Rajaa
9,086,897 B2 7/2015 Oh et al.
9,086,924 B2 7/2015 Barsness et al.
9,092,837 B2 7/2015 Bala et al.
9,098,528 B2 8/2015 Wang
9,104,477 B2 8/2015 Kodialam et al.
9,110,732 B1 8/2015 Forschmiedt et al.
9,110,770 B1 8/2015 Raju et al.
9,111,037 B1 8/2015 Nalis et al.
9,112,813 B2 8/2015 Jackson
9,116,733 B2 8/2015 Banga et al.
9,130,900 B2 9/2015 Tran
9,141,410 B2 9/2015 Leafe et al.
9,141,947 B1 * 9/2015 Furr ...................... H04M 15/80
9,146,764 B1 9/2015 Wagner
9,152,406 B2 10/2015 De et al.
9,154,955 B1 10/2015 Bertz et al.
9,164,754 B1 10/2015 Pohlack
9,176,871 B1 11/2015 Serlet
9,183,019 B2 11/2015 Kruglick
9,189,778 B1 11/2015 Sh. Al-Rashidi
9,195,520 B2 11/2015 Turk
9,208,007 B2 12/2015 Harper et al.
9,218,190 B2 12/2015 Anand et al.
9,223,561 B2 12/2015 Orveillon et al.
9,223,966 B1 12/2015 Satish et al.
9,250,893 B2 2/2016 Blahaerath et al.
9,268,586 B2 2/2016 Voccio et al.
9,298,633 B1 3/2016 Zhao et al.
9,317,689 B2 4/2016 Aissi
9,323,556 B2 4/2016 Wagner
9,361,145 B1 6/2016 Wilson et al.
9,405,582 B2 8/2016 Fuller et al.
9,411,645 B1 8/2016 Duan et al.
9,413,626 B2 8/2016 Reque et al.
9,417,918 B2 8/2016 Chin et al.
9,430,290 B1 8/2016 Gupta et al.
9,436,555 B2 9/2016 Dornemann et al.
9,461,996 B2 10/2016 Hayton et al.
9,471,775 B1 10/2016 Wagner et al.
9,471,776 B2 10/2016 Gu et al.
9,483,335 B1 11/2016 Wagner et al.

(56) References Cited

U.S. PATENT DOCUMENTS 9,489,227 B2 11/2016 Oh et al.
9,497,136 B1 11/2016 Ramarao et al.
9,501,345 B1 11/2016 Lietz et al.
9,514,037 B1 12/2016 Dow et al.
9,537,788 B2 1/2017 Reque et al.
9,563,613 B1 2/2017 Dinkel et al.
9,565,190 B1 2/2017 Telvik et al.
9,575,798 B2 2/2017 Terayama et al.
9,588,790 B1 3/2017 Wagner et al.
9,594,590 B2 3/2017 Hsu
9,596,350 B1 3/2017 Dymshyts et al.
9,600,312 B2 3/2017 Wagner et al.
9,613,127 B1 4/2017 Rus et al.
9,626,204 B1 4/2017 Banga et al.
9,628,332 B2 4/2017 Bruno, Jr. et al.
9,635,132 B1 4/2017 Lin et al.
9,652,306 B1 5/2017 Wagner et al.
9,652,617 B1 5/2017 Evans et al.
9,654,508 B2 5/2017 Barton et al.
9,661,011 B1 5/2017 Van Horenbeeck et al.
9,678,773 B1 6/2017 Wagner et al.
9,678,778 B1 6/2017 Youseff
9,703,681 B2 7/2017 Taylor et al.
9,715,402 B2 7/2017 Wagner et al.
9,720,661 B2 8/2017 Gschwind et al.
9,720,662 B2 8/2017 Gschwind et al.
9,727,725 B2 8/2017 Wagner et al.
9,733,967 B2 8/2017 Wagner et al.
9,760,387 B2 9/2017 Wagner et al.
9,760,443 B2 9/2017 Tarasuk-Levin et al.
9,767,271 B2 9/2017 Ghose
9,785,476 B2 10/2017 Wagner et al.
9,787,779 B2 10/2017 Frank et al.
9,798,831 B2 10/2017 Chattopadhyay et al.
9,799,017 B1 10/2017 Vermeulen et al.
9,811,363 B1 11/2017 Wagner
9,811,434 B1 11/2017 Wagner
9,817,695 B2 11/2017 Clark
9,830,175 B1 11/2017 Wagner
9,830,193 B1 11/2017 Wagner et al.
9,830,449 B1 11/2017 Wagner
9,864,636 B1 1/2018 Patel et al.
9,898,393 B2 2/2018 Moorthi et al.
9,910,713 B2 3/2018 Wisniewski et al.
9,921,864 B2 3/2018 Singaravelu et al.
9,928,108 B1 3/2018 Wagner et al.
9,929,916 B1 3/2018 Subramanian et al.
9,930,103 B2 3/2018 Thompson
9,930,133 B2 3/2018 Susarla et al.
9,952,896 B2 4/2018 Wagner et al.
9,977,691 B2 5/2018 Marriner et al.
9,979,817 B2 5/2018 Huang et al.
9,983,982 B1 5/2018 Kumar et al.
10,002,026 B1 6/2018 Wagner
10,002,036 B2 6/2018 Fuchs et al.
10,013,267 B1 7/2018 Wagner et al.
10,042,660 B2 8/2018 Wagner et al.
10,048,974 B1 8/2018 Wagner et al.
10,061,613 B1 8/2018 Brooker et al.
10,067,801 B1 9/2018 Wagner
10,102,040 B2 10/2018 Marriner et al.
10,108,443 B2 10/2018 Wagner et al.
10,139,876 B2 11/2018 Lu et al.
10,140,137 B2 11/2018 Wagner
10,146,635 B1 12/2018 Chai et al.
10,162,655 B2 12/2018 Tuch et al.
10,162,672 B2 12/2018 Wagner et al.
10,162,688 B2 12/2018 Wagner
10,191,861 B1 1/2019 Steinberg
10,193,839 B2 1/2019 Tandon et al.
10,198,298 B2 2/2019 Bishop et al.
10,203,990 B2 2/2019 Wagner et al.
10,248,467 B2 4/2019 Wisniewski et al.
10,255,090 B2 4/2019 Tuch et al.
10,277,708 B2 4/2019 Wagner et al.
10,282,229 B2 5/2019 Wagner et al.
10,303,492 B1 5/2019 Wagner et al.
10,303,576 B1 * 5/2019 Seymour ............. H04L 43/0817
10,318,347 B1 6/2019 Wagner
10,331,462 B1 6/2019 Varda et al.
10,346,625 B2 7/2019 Anderson et al.
10,353,678 B1 7/2019 Wagner
10,353,746 B2 7/2019 Reque et al.
10,360,025 B2 7/2019 Foskett et al.
10,360,067 B1 7/2019 Wagner
10,365,985 B2 7/2019 Wagner
10,387,177 B2 8/2019 Wagner et al.
10,402,231 B2 9/2019 Marriner et al.
10,423,158 B1 9/2019 Hadlich
10,437,629 B2 10/2019 Wagner et al.
10,445,140 B1 10/2019 Sagar et al.
10,459,822 B1 10/2019 Gondi
10,496,547 B1 12/2019 Naenko et al.
10,503,626 B2 12/2019 Idicula et al.
10,528,390 B2 1/2020 Brooker et al.
10,531,226 B1 1/2020 Wang et al.
10,552,193 B2 2/2020 Wagner et al.
10,552,442 B1 2/2020 Lusk et al.
10,564,946 B1 2/2020 Wagner et al.
10,572,375 B1 2/2020 Wagner
10,592,269 B2 3/2020 Wagner et al.
10,608,973 B2 3/2020 Kuo et al.
10,615,984 B1 4/2020 Wang
10,623,476 B2 4/2020 Thompson
10,637,817 B2 4/2020 Kuo et al.
10,649,749 B1 5/2020 Brooker et al.
10,649,792 B1 5/2020 Kulchytskyy et al.
10,650,156 B2 5/2020 Anderson et al.
10,652,350 B2 5/2020 Wozniak
10,678,522 B1 6/2020 Yerramreddy et al.
10,686,605 B2 6/2020 Chhabra et al.
10,691,498 B2 6/2020 Wagner
10,713,080 B1 7/2020 Brooker et al.
10,719,367 B1 7/2020 Kim et al.
10,725,752 B1 7/2020 Wagner et al.
10,725,826 B1 7/2020 Sagar et al.
10,732,951 B2 8/2020 Jayanthi et al.
10,733,085 B1 8/2020 Wagner
10,740,149 B2 8/2020 Bogineni et al.
10,754,701 B1 8/2020 Wagner
10,776,091 B1 9/2020 Wagner et al.
10,776,171 B2 9/2020 Wagner et al.
10,817,331 B2 10/2020 Mullen et al.
10,824,484 B2 11/2020 Wagner et al.
10,831,898 B1 11/2020 Wagner
10,846,117 B1 11/2020 Steinberg
10,853,112 B2 12/2020 Wagner et al.
10,853,115 B2 12/2020 Mullen et al.
10,884,722 B2 1/2021 Brooker et al.
10,884,787 B1 1/2021 Wagner et al.
10,884,802 B2 1/2021 Wagner et al.
10,884,812 B2 1/2021 Brooker et al.
10,891,145 B2 1/2021 Wagner et al.
10,915,371 B2 2/2021 Wagner et al.
10,942,795 B1 3/2021 Yanacek et al.
10,949,237 B2 3/2021 Piwonka et al.
10,956,185 B2 3/2021 Wagner
10,956,244 B1 3/2021 Cho
11,010,188 B1 5/2021 Brooker et al.
11,016,815 B2 5/2021 Wisniewski et al.
11,044,198 B1 6/2021 Ahn et al.
11,082,333 B1 8/2021 Lam et al.
11,099,870 B1 8/2021 Brooker et al.
11,099,917 B2 8/2021 Hussels et al.
11,115,404 B2 9/2021 Siefker et al.
11,119,809 B1 9/2021 Brooker et al.
11,119,813 B1 9/2021 Kasaragod
11,119,826 B2 9/2021 Yanacek et al.
11,126,469 B2 9/2021 Reque et al.
11,132,213 B1 9/2021 Wagner et al.
11,146,569 B1 10/2021 Brooker et al.
11,159,528 B2 10/2021 Siefker et al.
11,188,391 B1 11/2021 Sule
11,190,609 B2 11/2021 Siefker et al.

(56) References Cited

U.S. PATENT DOCUMENTS 11,231,955 B1 1/2022 Shahane et al.
11,243,819 B1 2/2022 Wagner
11,243,953 B2 2/2022 Wagner et al.
11,263,034 B2 3/2022 Wagner et al.
11,272,015 B2 3/2022 Thum et al.
11,314,547 B1 4/2022 Tang et al.
11,327,992 B1 5/2022 Batsakis et al.
11,354,169 B2 6/2022 Marriner et al.
11,360,793 B2 6/2022 Wagner et al.
11,392,497 B1 7/2022 Brooker et al.
11,394,636 B1 7/2022 Walker et al.
11,411,771 B1 8/2022 Dawani et al.
11,461,124 B2 10/2022 Wagner et al.
11,467,890 B2 10/2022 Wagner
11,550,713 B1 1/2023 Piwonka et al.
11,561,811 B2 1/2023 Wagner
11,593,270 B1 2/2023 Brooker et al.
11,656,892 B1 5/2023 Harris et al.
11,714,675 B2 8/2023 Brooker et al.
11,778,053 B1 10/2023 Allen
11,816,504 B2 11/2023 Bogineni et al.
11,843,517 B1 12/2023 Prateek et al.
11,966,308 B2 4/2024 Hicks et al.
12,056,515 B1 8/2024 Mills et al.
12,063,166 B1 8/2024 Samba et al.
12,081,629 B1 9/2024 Wei et al.
12,177,110 B1 12/2024 Choudhry et al.
12,381,878 B1 8/2025 Gupta et al.
12,476,978 B2 11/2025 Rajagopal et al.
2001/0044817 A1 11/2001 Asano et al.
2002/0083012 A1 6/2002 Bush et al.
2002/0120685 A1 8/2002 Srivastava et al.
2002/0172273 A1 11/2002 Baker et al.
2003/0071842 A1 4/2003 King et al.
2003/0084434 A1 5/2003 Ren
2003/0149801 A1 8/2003 Kushnirskiy
2003/0177186 A1 9/2003 Goodman et al.
2003/0191795 A1 10/2003 Bernardin et al.
2003/0208569 A1 11/2003 O'Brien et al.
2003/0229794 A1 12/2003 James, II et al.
2004/0003087 A1 1/2004 Chambliss et al.
2004/0019886 A1 1/2004 Berent et al.
2004/0044721 A1 3/2004 Song et al.
2004/0049768 A1 3/2004 Matsuyama et al.
2004/0098154 A1 5/2004 McCarthy
2004/0158551 A1 8/2004 Santosuosso
2004/0205493 A1 10/2004 Simpson et al.
2004/0249947 A1 12/2004 Novaes et al.
2004/0268358 A1 12/2004 Darling et al.
2005/0027611 A1 2/2005 Wharton
2005/0044301 A1 2/2005 Vasilevsky et al.
2005/0120160 A1 6/2005 Plouffe et al.
2005/0132167 A1 6/2005 Longobardi
2005/0132368 A1 6/2005 Sexton et al.
2005/0149535 A1 7/2005 Frey et al.
2005/0193113 A1 9/2005 Kokusho et al.
2005/0193283 A1 9/2005 Reinhardt et al.
2005/0237948 A1 10/2005 Wan et al.
2005/0257051 A1 11/2005 Richard
2005/0262183 A1 11/2005 Colrain et al.
2005/0262512 A1 11/2005 Schmidt et al.
2006/0010440 A1 1/2006 Anderson et al.
2006/0015740 A1 1/2006 Kramer
2006/0031448 A1 2/2006 Chu et al.
2006/0036941 A1 2/2006 Neil
2006/0080678 A1 4/2006 Bailey et al.
2006/0123066 A1 6/2006 Jacobs et al.
2006/0129684 A1 6/2006 Datta
2006/0155800 A1 7/2006 Matsumoto
2006/0168174 A1 7/2006 Gebhart et al.
2006/0184669 A1 8/2006 Vaidyanathan et al.
2006/0200668 A1 9/2006 Hybre et al.
2006/0212332 A1 9/2006 Jackson
2006/0218601 A1 9/2006 Michel
2006/0242647 A1 10/2006 Kimbrel et al.
2006/0242709 A1 10/2006 Seinfeld et al.
2006/0248195 A1 11/2006 Toumura et al.
2006/0259763 A1 11/2006 Cooperstein et al.
2006/0282330 A1 12/2006 Frank et al.
2006/0288120 A1 12/2006 Hoshino et al.
2007/0033085 A1 2/2007 Johnson
2007/0050779 A1 3/2007 Hayashi
2007/0067321 A1 3/2007 Bissett et al.
2007/0076244 A1 4/2007 Suzuki et al.
2007/0094396 A1 4/2007 Takano et al.
2007/0101325 A1 5/2007 Bystricky et al.
2007/0112864 A1 5/2007 Ben-Natan
2007/0130341 A1 6/2007 Ma
2007/0174419 A1 7/2007 O'Connell et al.
2007/0180449 A1 8/2007 Croft et al.
2007/0180450 A1 8/2007 Croft et al.
2007/0180493 A1 8/2007 Croft et al.
2007/0186212 A1 8/2007 Mazzaferri et al.
2007/0192082 A1 8/2007 Gaos et al.
2007/0192329 A1 8/2007 Croft et al.
2007/0198656 A1 8/2007 Mazzaferri et al.
2007/0199000 A1 8/2007 Shekhel et al.
2007/0220009 A1 9/2007 Morris et al.
2007/0226700 A1 9/2007 Gal et al.
2007/0240160 A1 10/2007 Paterson-Jones
2007/0255604 A1 11/2007 Seelig
2007/0300297 A1 12/2007 Dawson et al.
2008/0028409 A1 1/2008 Cherkasova et al.
2008/0052401 A1 2/2008 Bugenhagen et al.
2008/0052725 A1 2/2008 Stoodley et al.
2008/0082977 A1 4/2008 Araujo et al.
2008/0104247 A1 5/2008 Venkatakrishnan et al.
2008/0104608 A1 5/2008 Hyser et al.
2008/0115143 A1 5/2008 Shimizu et al.
2008/0126110 A1 5/2008 Haeberle et al.
2008/0126486 A1 5/2008 Heist
2008/0127125 A1 5/2008 Anckaert et al.
2008/0147893 A1 6/2008 Marripudi et al.
2008/0178278 A1 7/2008 Grinstein et al.
2008/0184340 A1 7/2008 Nakamura et al.
2008/0189468 A1 8/2008 Schmidt et al.
2008/0195369 A1 8/2008 Duyanovich et al.
2008/0201568 A1 8/2008 Quinn et al.
2008/0201711 A1 8/2008 Amir Husain
2008/0209423 A1 8/2008 Hirai
2008/0244547 A1 10/2008 Wintergerst et al.
2008/0288940 A1 11/2008 Adams et al.
2008/0307098 A1 12/2008 Kelly
2009/0006897 A1 1/2009 Sarsfield
2009/0013153 A1 1/2009 Hilton
2009/0018892 A1 1/2009 Grey et al.
2009/0025009 A1 1/2009 Brunswig et al.
2009/0034537 A1 2/2009 Colrain et al.
2009/0055810 A1 2/2009 Kondur
2009/0055829 A1 2/2009 Gibson
2009/0070355 A1 3/2009 Cadarette et al.
2009/0077569 A1 3/2009 Appleton et al.
2009/0125902 A1 5/2009 Ghosh et al.
2009/0158275 A1 6/2009 Wang et al.
2009/0158407 A1 6/2009 Nicodemus et al.
2009/0177860 A1 7/2009 Zhu et al.
2009/0183162 A1 7/2009 Kindel et al.
2009/0193410 A1 7/2009 Arthursson et al.
2009/0198769 A1 8/2009 Keller et al.
2009/0204960 A1 8/2009 Ben-yehuda et al.
2009/0204964 A1 8/2009 Foley et al.
2009/0222922 A1 9/2009 Sidiroglou et al.
2009/0271472 A1 10/2009 Scheifler et al.
2009/0288084 A1 11/2009 Astete et al.
2009/0300151 A1 12/2009 Friedman et al.
2009/0300599 A1 12/2009 Piotrowski
2009/0307430 A1 12/2009 Bruening et al.
2010/0023940 A1 1/2010 Iwamatsu et al.
2010/0031274 A1 2/2010 Sim-Tang
2010/0031325 A1 2/2010 Maigne et al.
2010/0036925 A1 2/2010 Haffner
2010/0037031 A1 2/2010 DeSantis et al.
2010/0058342 A1 3/2010 Machida
2010/0058351 A1 3/2010 Yahagi

(56) References Cited

U.S. PATENT DOCUMENTS

2010/0064299 A1 3/2010 Kacin et al.
2010/0070678 A1 3/2010 Zhang et al.
2010/0070725 A1 3/2010 Prahlad et al.
2010/0083048 A1 4/2010 Calinoiu et al.
2010/0083248 A1 4/2010 Wood et al.
2010/0094816 A1 4/2010 Groves, Jr. et al.
2010/0106926 A1 4/2010 Kandasamy et al.
2010/0114825 A1 5/2010 Siddegowda
2010/0115098 A1 5/2010 De Baer et al.
2010/0122343 A1 5/2010 Ghosh
2010/0131936 A1 5/2010 Cheriton
2010/0131959 A1 5/2010 Spiers et al.
2010/0146004 A1 6/2010 Sim-Tang
2010/0169477 A1 7/2010 Stienhans et al.
2010/0186011 A1 7/2010 Magenheimer
2010/0198972 A1 8/2010 Umbehocker
2010/0199285 A1 8/2010 Medovich
2010/0257116 A1 10/2010 Mehta et al.
2010/0257269 A1 10/2010 Clark
2010/0269109 A1 10/2010 Cartales
2010/0298011 A1 11/2010 Pelley et al.
2010/0299541 A1 11/2010 Ishikawa et al.
2010/0312871 A1 12/2010 Desantis et al.
2010/0325727 A1 12/2010 Neystadt et al.
2010/0329149 A1 12/2010 Singh et al.
2010/0329643 A1 12/2010 Kuang
2011/0004687 A1 1/2011 Takemura
2011/0010690 A1 1/2011 Howard et al.
2011/0010722 A1 1/2011 Matsuyama
2011/0023026 A1 1/2011 Oza
2011/0029970 A1 2/2011 Arasaratnam
2011/0029984 A1 2/2011 Norman et al.
2011/0035785 A1 2/2011 Mihara
2011/0040812 A1 2/2011 Phillips
2011/0055378 A1 3/2011 Ferris et al.
2011/0055396 A1 3/2011 DeHaan
2011/0055683 A1 3/2011 Jiang
2011/0078679 A1 3/2011 Bozek et al.
2011/0099204 A1 4/2011 Thaler
2011/0099551 A1 4/2011 Fahrig et al.
2011/0131572 A1 6/2011 Elyashev et al.
2011/0134761 A1 6/2011 Smith
2011/0141124 A1 6/2011 Halls et al.
2011/0153541 A1 6/2011 Koch et al.
2011/0153727 A1 6/2011 Li
2011/0153838 A1 6/2011 Belkine et al.
2011/0154353 A1 6/2011 Theroux et al.
2011/0173637 A1 7/2011 Brandwine et al.
2011/0179162 A1 7/2011 Mayo et al.
2011/0184993 A1 7/2011 Chawla et al.
2011/0208866 A1 8/2011 Marmolejo-Meillon et al.
2011/0225277 A1 9/2011 Freimuth et al.
2011/0231680 A1 9/2011 Padmanabhan et al.
2011/0247005 A1 10/2011 Benedetti et al.
2011/0252430 A1 10/2011 Chapman et al.
2011/0258603 A1 10/2011 Wisnovsky et al.
2011/0265067 A1 10/2011 Schulte et al.
2011/0265069 A1 10/2011 Fee et al.
2011/0265164 A1 10/2011 Lucovsky
2011/0271276 A1 11/2011 Ashok et al.
2011/0276945 A1 11/2011 Chasman et al.
2011/0276963 A1 11/2011 Wu et al.
2011/0296412 A1 12/2011 Banga et al.
2011/0314465 A1 12/2011 Smith et al.
2011/0321033 A1 12/2011 Kelkar et al.
2011/0321051 A1 12/2011 Rastogi
2012/0011496 A1 1/2012 Shimamura
2012/0011511 A1 1/2012 Horvitz et al.
2012/0016721 A1 1/2012 Weinman
2012/0041970 A1 2/2012 Ghosh et al.
2012/0054744 A1 3/2012 Singh et al.
2012/0060207 A1 3/2012 Mardikar et al.
2012/0072762 A1 3/2012 Atchison et al.
2012/0072914 A1 3/2012 Ota
2012/0072920 A1 3/2012 Kawamura
2012/0079004 A1 3/2012 Herman
2012/0096271 A1 4/2012 Ramarathinam et al.
2012/0096468 A1 4/2012 Chakravorty et al.
2012/0102307 A1 4/2012 Wong
2012/0102333 A1 4/2012 Wong
2012/0102481 A1 4/2012 Mani et al.
2012/0102493 A1 4/2012 Allen et al.
2012/0110155 A1 5/2012 Adlung et al.
2012/0110164 A1 5/2012 Frey et al.
2012/0110570 A1 5/2012 Jacobson et al.
2012/0110588 A1 5/2012 Bieswanger et al.
2012/0110603 A1 5/2012 Kaneko et al.
2012/0124563 A1 5/2012 Chung et al.
2012/0131379 A1 5/2012 Tameshige et al.
2012/0144290 A1 6/2012 Goldman et al.
2012/0166624 A1 6/2012 Suit et al.
2012/0173709 A1 7/2012 Li et al.
2012/0192184 A1 7/2012 Burckart et al.
2012/0197795 A1 8/2012 Campbell et al.
2012/0197958 A1 8/2012 Nightingale et al.
2012/0198442 A1 8/2012 Kashyap et al.
2012/0198514 A1 8/2012 McCune et al.
2012/0204164 A1 8/2012 Castanos et al.
2012/0209947 A1 8/2012 Glaser et al.
2012/0222038 A1 8/2012 Katragadda et al.
2012/0233464 A1 9/2012 Miller et al.
2012/0254193 A1 10/2012 Chattopadhyay et al.
2012/0324052 A1 12/2012 Paleja et al.
2012/0324236 A1 12/2012 Srivastava et al.
2012/0331113 A1 12/2012 Jain et al.
2013/0014101 A1 1/2013 Ballani et al.
2013/0042234 A1 2/2013 DeLuca et al.
2013/0054804 A1 2/2013 Jana et al.
2013/0054927 A1 2/2013 Raj et al.
2013/0055262 A1 2/2013 Lubsey et al.
2013/0061208 A1 3/2013 Tsao et al.
2013/0061212 A1 3/2013 Krause et al.
2013/0061220 A1 3/2013 Gnanasambandam et al.
2013/0067484 A1 3/2013 Sonoda et al.
2013/0067494 A1 3/2013 Srour et al.
2013/0080641 A1 3/2013 Lui et al.
2013/0091387 A1 4/2013 Bohnet et al.
2013/0097601 A1 4/2013 Podvratnik et al.
2013/0111032 A1 5/2013 Alapati et al.
2013/0111469 A1 5/2013 B et al.
2013/0124807 A1 5/2013 Nielsen et al.
2013/0132283 A1 5/2013 Hayhow et al.
2013/0132942 A1 5/2013 Wang
2013/0132953 A1 5/2013 Chuang et al.
2013/0139152 A1 5/2013 Chang et al.
2013/0139166 A1 5/2013 Zhang et al.
2013/0145354 A1 6/2013 Bruening et al.
2013/0151587 A1 6/2013 Takeshima et al.
2013/0151648 A1 6/2013 Luna
2013/0151684 A1 6/2013 Forsman et al.
2013/0152047 A1 6/2013 Moorthi et al.
2013/0167147 A1 6/2013 Corrie et al.
2013/0179574 A1 7/2013 Calder et al.
2013/0179881 A1 7/2013 Calder et al.
2013/0179894 A1 7/2013 Calder et al.
2013/0179895 A1 7/2013 Calder et al.
2013/0181998 A1 7/2013 Malakapalli et al.
2013/0185719 A1 7/2013 Kar et al.
2013/0185729 A1 7/2013 Vasic et al.
2013/0191847 A1 7/2013 Sirota et al.
2013/0191924 A1 7/2013 Tedesco
2013/0198319 A1 8/2013 Shen et al.
2013/0198743 A1 8/2013 Kruglick
2013/0198748 A1 8/2013 Sharp et al.
2013/0198763 A1 8/2013 Kunze et al.
2013/0205092 A1 8/2013 Roy et al.
2013/0205114 A1 8/2013 Badam et al.
2013/0219390 A1 8/2013 Lee et al.
2013/0227097 A1 8/2013 Yasuda et al.
2013/0227534 A1 8/2013 Ike et al.
2013/0227563 A1 8/2013 McGrath
2013/0227641 A1 8/2013 White et al.
2013/0227710 A1 8/2013 Barak et al.
2013/0232190 A1 9/2013 Miller et al.

(56) References Cited

U.S. PATENT DOCUMENTS

2013/0232480 A1 9/2013 Winterfeldt et al.
2013/0239125 A1 9/2013 Iorio
2013/0246944 A1 9/2013 Pandiyan et al.
2013/0262556 A1 10/2013 Xu et al.
2013/0263117 A1 10/2013 Konik et al.
2013/0274006 A1 10/2013 Hudlow et al.
2013/0275376 A1 10/2013 Hudlow et al.
2013/0275958 A1 10/2013 Ivanov et al.
2013/0275969 A1 10/2013 Dimitrov
2013/0275975 A1 10/2013 Masuda et al.
2013/0283141 A1 10/2013 Stevenson et al.
2013/0283176 A1 10/2013 Hoole et al.
2013/0290538 A1 10/2013 Gmach et al.
2013/0291087 A1 10/2013 Kailash et al.
2013/0297964 A1 11/2013 Hegdal et al.
2013/0298183 A1 11/2013 McGrath et al.
2013/0311650 A1 11/2013 Brandwine et al.
2013/0326506 A1 12/2013 McGrath et al.
2013/0326507 A1 12/2013 McGrath et al.
2013/0332660 A1 12/2013 Talagala et al.
2013/0339950 A1 12/2013 Ramarathinam et al.
2013/0346470 A1 12/2013 Obstfeld et al.
2013/0346946 A1 12/2013 Pinnix
2013/0346952 A1 12/2013 Huang et al.
2013/0346964 A1 12/2013 Nobuoka et al.
2013/0346987 A1 12/2013 Raney et al.
2013/0346994 A1 12/2013 Chen et al.
2013/0347095 A1 12/2013 Barjatiya et al.
2014/0007097 A1 1/2014 Chin et al.
2014/0019523 A1 1/2014 Heymann et al.
2014/0019735 A1 1/2014 Menon et al.
2014/0019965 A1 1/2014 Neuse et al.
2014/0019966 A1 1/2014 Neuse et al.
2014/0040343 A1 2/2014 Nickolov et al.
2014/0040857 A1 2/2014 Trinchini et al.
2014/0040880 A1 2/2014 Brownlow et al.
2014/0047437 A1 2/2014 Wu et al.
2014/0058871 A1 2/2014 Marr et al.
2014/0059209 A1 2/2014 Alnoor
2014/0059226 A1 2/2014 Messerli et al.
2014/0059552 A1 2/2014 Cunningham et al.
2014/0068568 A1 3/2014 Wisnovsky
2014/0068608 A1 3/2014 Kulkarni
2014/0068611 A1 3/2014 McGrath et al.
2014/0073300 A1 3/2014 Leeder et al.
2014/0081984 A1 3/2014 Sitsky et al.
2014/0082165 A1 3/2014 Marr et al.
2014/0082201 A1 3/2014 Shankari et al.
2014/0101643 A1 4/2014 Inoue
2014/0101649 A1 4/2014 Kamble et al.
2014/0108722 A1 4/2014 Lipchuk et al.
2014/0109087 A1 4/2014 Jujare et al.
2014/0109088 A1 4/2014 Dournov et al.
2014/0109092 A1 4/2014 Jacobson et al.
2014/0129667 A1 5/2014 Ozawa
2014/0130040 A1 5/2014 Lemanski
2014/0137110 A1 5/2014 Engle et al.
2014/0164551 A1 6/2014 Resch et al.
2014/0173614 A1 6/2014 Konik et al.
2014/0173616 A1 6/2014 Bird et al.
2014/0180862 A1 6/2014 Certain et al.
2014/0189677 A1 7/2014 Curzi et al.
2014/0189704 A1 7/2014 Narvaez et al.
2014/0201735 A1 7/2014 Kannan et al.
2014/0207912 A1 7/2014 Thibeault
2014/0214752 A1 7/2014 Rash et al.
2014/0215073 A1 7/2014 Dow et al.
2014/0229221 A1 8/2014 Shih et al.
2014/0229942 A1 8/2014 Wiseman et al.
2014/0245297 A1 8/2014 Hackett
2014/0258777 A1 9/2014 Cheriton
2014/0279581 A1 9/2014 Devereaux
2014/0280325 A1 9/2014 Krishnamurthy et al.
2014/0282418 A1 9/2014 Wood et al.
2014/0282559 A1 9/2014 Verduzco et al.
2014/0282615 A1 9/2014 Cavage et al.
2014/0282629 A1 9/2014 Gupta et al.
2014/0283045 A1 9/2014 Brandwine et al.
2014/0289286 A1 9/2014 Gusak
2014/0298295 A1 10/2014 Overbeck
2014/0304246 A1 10/2014 Helmich et al.
2014/0304698 A1 10/2014 Chigurapati et al.
2014/0304815 A1 10/2014 Maeda
2014/0317617 A1 10/2014 O'Donnell
2014/0330936 A1 11/2014 Factor et al.
2014/0331222 A1 11/2014 Zheng
2014/0337953 A1 11/2014 Banatwala et al.
2014/0344457 A1 11/2014 Bruno, Jr. et al.
2014/0344736 A1 11/2014 Ryman et al.
2014/0351674 A1 11/2014 Grube et al.
2014/0359093 A1 12/2014 Raju et al.
2014/0359608 A1 12/2014 Tsirkin et al.
2014/0365781 A1 12/2014 Dmitrienko et al.
2014/0372489 A1 12/2014 Jaiswal et al.
2014/0372533 A1 12/2014 Fu et al.
2014/0380085 A1 12/2014 Rash et al.
2015/0006487 A1 1/2015 Yang et al.
2015/0025989 A1 1/2015 Dunstan
2015/0033241 A1 1/2015 Jackson et al.
2015/0039891 A1 2/2015 Ignatchenko et al.
2015/0040229 A1 2/2015 Chan et al.
2015/0046926 A1 2/2015 Kenchammana-Hosekote et al.
2015/0046971 A1 2/2015 Huh et al.
2015/0052258 A1 2/2015 Johnson et al.
2015/0058914 A1 2/2015 Yadav
2015/0067019 A1 3/2015 Balko
2015/0067830 A1 3/2015 Johansson et al.
2015/0074659 A1 3/2015 Madsen et al.
2015/0074661 A1 3/2015 Kothari et al.
2015/0074662 A1 3/2015 Saladi et al.
2015/0074675 A1 3/2015 Qi et al.
2015/0081885 A1 3/2015 Thomas et al.
2015/0095822 A1 4/2015 Feis et al.
2015/0106805 A1 4/2015 Melander et al.
2015/0120928 A1 4/2015 Gummaraju et al.
2015/0121391 A1 4/2015 Wang
2015/0134626 A1 5/2015 Theimer et al.
2015/0135287 A1 5/2015 Medeiros et al.
2015/0142747 A1 5/2015 Zou
2015/0142952 A1 5/2015 Bragstad et al.
2015/0143374 A1 5/2015 Banga et al.
2015/0143381 A1 5/2015 Chin et al.
2015/0146716 A1 5/2015 Olivier et al.
2015/0154046 A1 6/2015 Farkas et al.
2015/0161384 A1 6/2015 Gu et al.
2015/0163231 A1 6/2015 Sobko et al.
2015/0178019 A1 6/2015 Hegdal et al.
2015/0178110 A1 6/2015 Li et al.
2015/0186129 A1 7/2015 Apte et al.
2015/0188775 A1 7/2015 Van Der Walt et al.
2015/0199218 A1 7/2015 Wilson et al.
2015/0205596 A1 7/2015 Hiltegen et al.
2015/0206139 A1 7/2015 Lea
2015/0212818 A1 7/2015 Gschwind et al.
2015/0227598 A1 8/2015 Hahn et al.
2015/0229645 A1 8/2015 Keith et al.
2015/0235144 A1 8/2015 Gusev et al.
2015/0242225 A1 8/2015 Muller et al.
2015/0254248 A1 9/2015 Burns et al.
2015/0256514 A1 9/2015 Laivand et al.
2015/0256621 A1 9/2015 Noda et al.
2015/0261578 A1 9/2015 Greden et al.
2015/0264014 A1 9/2015 Budhani et al.
2015/0269494 A1 9/2015 Kardes et al.
2015/0271073 A1 9/2015 Saladi et al.
2015/0271280 A1 9/2015 Zhang et al.
2015/0289220 A1 10/2015 Kim et al.
2015/0309923 A1 10/2015 Iwata et al.
2015/0319160 A1 11/2015 Ferguson et al.
2015/0319174 A1 11/2015 Hayton et al.
2015/0324174 A1 11/2015 Bromley et al.
2015/0324182 A1 11/2015 Barros et al.
2015/0324210 A1 11/2015 Carlson
2015/0324229 A1 11/2015 Valine

(56) References Cited

U.S. PATENT DOCUMENTS

2015/0332048 A1 11/2015 Mooring et al.
2015/0332195 A1 11/2015 Jue
2015/0334173 A1 11/2015 Coulmeau et al.
2015/0350701 A1 12/2015 Lemus et al.
2015/0356294 A1 12/2015 Tan et al.
2015/0363181 A1 12/2015 Alberti et al.
2015/0363304 A1 12/2015 Nagamalla et al.
2015/0370560 A1 12/2015 Tan et al.
2015/0370591 A1 12/2015 Tuch et al.
2015/0370592 A1 12/2015 Tuch et al.
2015/0371244 A1 12/2015 Neuse et al.
2015/0378762 A1 12/2015 Saladi et al.
2015/0378764 A1 12/2015 Sivasubramanian et al.
2015/0378765 A1 12/2015 Singh et al.
2015/0379167 A1 12/2015 Griffith et al.
2016/0011901 A1 1/2016 Hurwitz et al.
2016/0012099 A1 1/2016 Tuatini et al.
2016/0019081 A1 1/2016 Chandrasekaran et al.
2016/0019082 A1 1/2016 Chandrasekaran et al.
2016/0019536 A1 1/2016 Ortiz et al.
2016/0021112 A1 1/2016 Katieb
2016/0026486 A1 1/2016 Abdallah
2016/0048606 A1 2/2016 Rubinstein et al.
2016/0070714 A1 3/2016 D'Sa et al.
2016/0072727 A1 3/2016 Leafe et al.
2016/0072781 A1 3/2016 Zhang et al.
2016/0077901 A1 3/2016 Roth et al.
2016/0092320 A1 3/2016 Baca
2016/0092493 A1 3/2016 Ko et al.
2016/0098285 A1 4/2016 Davis et al.
2016/0100036 A1 4/2016 Lo et al.
2016/0103739 A1 4/2016 Huang et al.
2016/0110188 A1 4/2016 Verde et al.
2016/0117163 A1 4/2016 Fukui et al.
2016/0117254 A1 4/2016 Susarla et al.
2016/0119289 A1 4/2016 Jain et al.
2016/0124665 A1 5/2016 Jain et al.
2016/0124978 A1 5/2016 Nithrakashyap et al.
2016/0140180 A1 5/2016 Park et al.
2016/0150053 A1 5/2016 Janczuk et al.
2016/0188367 A1 6/2016 Zeng
2016/0191420 A1 6/2016 Nagarajan et al.
2016/0198235 A1 7/2016 Liu et al.
2016/0203219 A1 7/2016 Hoch et al.
2016/0212007 A1 7/2016 Alatorre et al.
2016/0226955 A1 8/2016 Moorthi et al.
2016/0282930 A1 9/2016 Ramachandran et al.
2016/0285906 A1 9/2016 Fine et al.
2016/0292016 A1 10/2016 Bussard et al.
2016/0294614 A1 10/2016 Searle et al.
2016/0306613 A1 10/2016 Busi et al.
2016/0315910 A1 10/2016 Kaufman
2016/0350099 A1 12/2016 Suparna et al.
2016/0350124 A1 12/2016 Gschwind et al.
2016/0357536 A1 12/2016 Firlik et al.
2016/0364265 A1 12/2016 Cao et al.
2016/0364316 A1 12/2016 Bhat et al.
2016/0371127 A1 12/2016 Antony et al.
2016/0371156 A1 12/2016 Merriman
2016/0378449 A1 12/2016 Khazanchi et al.
2016/0378525 A1 12/2016 Bjorkengren
2016/0378547 A1 12/2016 Brouwer et al.
2016/0378554 A1 12/2016 Gummaraju et al.
2017/0004169 A1 1/2017 Merrill et al.
2017/0032000 A1 2/2017 Sharma et al.
2017/0041144 A1 2/2017 Krapf et al.
2017/0041309 A1 2/2017 Ekambaram et al.
2017/0060615 A1 3/2017 Thakkar et al.
2017/0060621 A1 3/2017 Whipple et al.
2017/0068574 A1 3/2017 Cherkasova et al.
2017/0075749 A1 3/2017 Ambichl et al.
2017/0083381 A1 3/2017 Cong et al.
2017/0085447 A1 3/2017 Chen et al.
2017/0085502 A1 3/2017 Biruduraju
2017/0085591 A1 3/2017 Ganda et al.
2017/0091235 A1 3/2017 Yammine et al.
2017/0091296 A1 3/2017 Beard et al.
2017/0093684 A1 3/2017 Jayaraman et al.
2017/0093920 A1 3/2017 Ducatel et al.
2017/0134519 A1 5/2017 Chen et al.
2017/0142099 A1 5/2017 Hinohara et al.
2017/0147656 A1 5/2017 Choudhary et al.
2017/0149740 A1 5/2017 Mansour et al.
2017/0153965 A1 6/2017 Nitta et al.
2017/0161059 A1 6/2017 Wood et al.
2017/0177266 A1 6/2017 Doerner et al.
2017/0177441 A1 6/2017 Chow
2017/0177854 A1 6/2017 Gligor et al.
2017/0188213 A1 6/2017 Nirantar et al.
2017/0192825 A1 7/2017 Biberman et al.
2017/0221000 A1 8/2017 Anand
2017/0230262 A1 8/2017 Sreeramoju et al.
2017/0230499 A1 8/2017 Mumick et al.
2017/0249130 A1 8/2017 Smiljamic et al.
2017/0264681 A1 9/2017 Apte et al.
2017/0272462 A1 9/2017 Kraemer et al.
2017/0286187 A1 10/2017 Chen et al.
2017/0286278 A1 10/2017 Thomas et al.
2017/0288878 A1 10/2017 Lee et al.
2017/0308520 A1 10/2017 Beahan, Jr. et al.
2017/0315163 A1 11/2017 Wang et al.
2017/0322824 A1 11/2017 Reuther et al.
2017/0329578 A1 11/2017 Iscen
2017/0346808 A1 11/2017 Anzai et al.
2017/0353851 A1 12/2017 Gonzalez et al.
2017/0364345 A1 12/2017 Fontoura et al.
2017/0371720 A1 12/2017 Basu et al.
2017/0372142 A1 12/2017 Bilobrov
2018/0004555 A1 1/2018 Ramanathan et al.
2018/0004556 A1 1/2018 Marriner et al.
2018/0032410 A1 2/2018 Kang et al.
2018/0046453 A1 2/2018 Nair et al.
2018/0046482 A1 2/2018 Karve et al.
2018/0060132 A1 3/2018 Maru et al.
2018/0060221 A1 3/2018 Yim et al.
2018/0060318 A1 3/2018 Yang et al.
2018/0067841 A1 3/2018 Mahimkar
2018/0067873 A1 3/2018 Pikhur et al.
2018/0069702 A1 3/2018 Ayyadevara et al.
2018/0081717 A1 3/2018 Li
2018/0089232 A1 3/2018 Spektor et al.
2018/0095738 A1 4/2018 Dürkop et al.
2018/0113770 A1 4/2018 Hasanov et al.
2018/0113793 A1 4/2018 Fink et al.
2018/0121665 A1 5/2018 Anderson et al.
2018/0129684 A1 5/2018 Wilson et al.
2018/0144263 A1 5/2018 Saxena et al.
2018/0150339 A1 5/2018 Pan et al.
2018/0152401 A1 5/2018 Tandon et al.
2018/0152405 A1 5/2018 Kuo et al.
2018/0152406 A1 5/2018 Kuo et al.
2018/0165110 A1 6/2018 Htay
2018/0192101 A1 7/2018 Bilobrov
2018/0225096 A1 8/2018 Mishra et al.
2018/0227300 A1 8/2018 Nakic et al.
2018/0239636 A1 8/2018 Arora et al.
2018/0253333 A1 9/2018 Gupta
2018/0268130 A1 9/2018 Ghosh et al.
2018/0275987 A1 9/2018 Vandeputte
2018/0285101 A1 10/2018 Yahav et al.
2018/0300111 A1 10/2018 Bhat et al.
2018/0314845 A1 11/2018 Anderson et al.
2018/0316552 A1 11/2018 Subramani Nadar et al.
2018/0341504 A1 11/2018 Kissell
2018/0365422 A1 12/2018 Callaghan et al.
2018/0367517 A1 12/2018 Tus
2018/0375781 A1 12/2018 Chen et al.
2019/0004866 A1 1/2019 Du et al.
2019/0018715 A1 1/2019 Behrendt et al.
2019/0028552 A1 1/2019 Johnson, II et al.
2019/0034095 A1 1/2019 Singh et al.
2019/0043231 A1 2/2019 Uzgin et al.
2019/0072529 A1 3/2019 Andrawes et al.
2019/0073430 A1 3/2019 Webster

(56) References Cited

U.S. PATENT DOCUMENTS

| | | | |
|---|---|---|---|
| 2019/0079751 | A1 | 3/2019 | Foskett et al. |
| 2019/0102278 | A1 | 4/2019 | Gahlin et al. |
| 2019/0140831 | A1 | 5/2019 | De Lima Junior et al. |
| 2019/0141015 | A1 | 5/2019 | Nellen |
| 2019/0147085 | A1 | 5/2019 | Pal et al. |
| 2019/0147515 | A1 | 5/2019 | Hurley et al. |
| 2019/0171423 | A1 | 6/2019 | Mishra et al. |
| 2019/0179678 | A1 | 6/2019 | Banerjee et al. |
| 2019/0179684 | A1* | 6/2019 | On ........................... G06F 9/54 |
| 2019/0179725 | A1 | 6/2019 | Mital et al. |
| 2019/0180036 | A1 | 6/2019 | Shukla |
| 2019/0188288 | A1 | 6/2019 | Holm et al. |
| 2019/0235848 | A1 | 8/2019 | Swiecki et al. |
| 2019/0238590 | A1 | 8/2019 | Talukdar et al. |
| 2019/0250937 | A1 | 8/2019 | Thomas et al. |
| 2019/0268152 | A1 | 8/2019 | Sandoval et al. |
| 2019/0278938 | A1 | 9/2019 | Greene et al. |
| 2019/0286475 | A1 | 9/2019 | Mani |
| 2019/0286492 | A1 | 9/2019 | Gulsvig Wood et al. |
| 2019/0303117 | A1 | 10/2019 | Kocberber et al. |
| 2019/0311115 | A1 | 10/2019 | Lavi et al. |
| 2019/0318312 | A1 | 10/2019 | Foskett et al. |
| 2019/0320038 | A1 | 10/2019 | Walsh et al. |
| 2019/0324813 | A1 | 10/2019 | Bogineni et al. |
| 2019/0339955 | A1 | 11/2019 | Kuo et al. |
| 2019/0361802 | A1 | 11/2019 | Li et al. |
| 2019/0363885 | A1 | 11/2019 | Schiavoni et al. |
| 2019/0370113 | A1 | 12/2019 | Zhang et al. |
| 2020/0007456 | A1 | 1/2020 | Greenstein et al. |
| 2020/0026527 | A1 | 1/2020 | Xu et al. |
| 2020/0028936 | A1 | 1/2020 | Gupta et al. |
| 2020/0034471 | A1 | 1/2020 | Danilov et al. |
| 2020/0065079 | A1 | 2/2020 | Kocberber et al. |
| 2020/0073770 | A1 | 3/2020 | Mortimore, Jr. et al. |
| 2020/0073987 | A1 | 3/2020 | Perumala et al. |
| 2020/0081745 | A1 | 3/2020 | Cybulski et al. |
| 2020/0110691 | A1 | 4/2020 | Bryant et al. |
| 2020/0120120 | A1 | 4/2020 | Cybulski |
| 2020/0134030 | A1 | 4/2020 | Natanzon et al. |
| 2020/0136933 | A1 | 4/2020 | Raskar |
| 2020/0153798 | A1 | 5/2020 | Liebherr |
| 2020/0153897 | A1 | 5/2020 | Mestery et al. |
| 2020/0167208 | A1 | 5/2020 | Floes et al. |
| 2020/0192646 | A1 | 6/2020 | Yerramreddy et al. |
| 2020/0213151 | A1 | 7/2020 | Srivatsan et al. |
| 2020/0213359 | A1 | 7/2020 | Arbel et al. |
| 2020/0241930 | A1 | 7/2020 | Garg et al. |
| 2020/0327236 | A1 | 10/2020 | Pratt et al. |
| 2020/0348979 | A1 | 11/2020 | Calmon |
| 2020/0349067 | A1 | 11/2020 | Syamala et al. |
| 2020/0366587 | A1 | 11/2020 | White et al. |
| 2020/0401455 | A1 | 12/2020 | Church et al. |
| 2021/0019056 | A1 | 1/2021 | Mangione-Tran |
| 2021/0081233 | A1 | 3/2021 | Mullen et al. |
| 2021/0117534 | A1 | 4/2021 | Maximov et al. |
| 2021/0124822 | A1 | 4/2021 | Tiwary et al. |
| 2021/0176333 | A1 | 6/2021 | Coleman et al. |
| 2021/0294646 | A1 | 9/2021 | Hassaan et al. |
| 2021/0311758 | A1 | 10/2021 | Cao et al. |
| 2021/0314388 | A1 | 10/2021 | Zhou et al. |
| 2022/0012083 | A1 | 1/2022 | Brooker et al. |
| 2022/0147400 | A1* | 5/2022 | Cowan ................ G06F 11/3409 |
| 2022/0214863 | A1 | 7/2022 | Clement et al. |
| 2022/0376979 | A1* | 11/2022 | Vishnoi ............... H04L 67/1001 |
| 2022/0391238 | A1 | 12/2022 | Wagner |
| 2023/0024699 | A1 | 1/2023 | Bayoumi et al. |
| 2023/0033818 | A1* | 2/2023 | Baughman ............ G06F 9/5072 |
| 2023/0142895 | A1* | 5/2023 | Campbell ................. G06F 8/76 717/140 |
| 2023/0359508 | A1* | 11/2023 | Kalley .................. G06F 9/5077 |
| 2023/0409412 | A1 | 12/2023 | Kruegel et al. |
| 2024/0160461 | A1 | 5/2024 | Nanda et al. |
| 2025/0080416 | A1 | 3/2025 | Mitrache et al. |
| 2025/0110800 | A1 | 4/2025 | Rajagopal et al. |
| 2025/0112929 | A1 | 4/2025 | Rajagopal et al. |

FOREIGN PATENT DOCUMENTS

| | | | |
|---|---|---|---|
| CN | 101002170 | A | 7/2007 |
| CN | 101267334 | A | 9/2008 |
| CN | 101345757 | A | 1/2009 |
| CN | 101496005 | A | 7/2009 |
| CN | 101627388 | A | 1/2010 |
| CN | 101640700 | A | 2/2010 |
| CN | 101764824 | A | 6/2010 |
| CN | 102171712 | A | 8/2011 |
| CN | 102246152 | A | 11/2011 |
| CN | 102365858 | A | 2/2012 |
| CN | 102420846 | A | 4/2012 |
| CN | 102761549 | A | 10/2012 |
| CN | 103098027 | A | 5/2013 |
| CN | 103140828 | A | 6/2013 |
| CN | 103384237 | A | 11/2013 |
| CN | 103731427 | A | 4/2014 |
| CN | 104111848 | A | 10/2014 |
| CN | 104160378 | A | 11/2014 |
| CN | 104243479 | A | 12/2014 |
| CN | 104903854 | A | 9/2015 |
| CN | 105122243 | A | 12/2015 |
| CN | 105956000 | A | 9/2016 |
| CN | 106921651 | A | 7/2017 |
| CN | 107534672 | A | 1/2018 |
| CN | 114208112 | A | 3/2022 |
| EP | 2663052 | A1 | 11/2013 |
| EP | 3508975 | A1 | 7/2019 |
| JP | 2002-287974 | A | 10/2002 |
| JP | 2006-107599 | A | 4/2006 |
| JP | 2007-080161 | A | 3/2007 |
| JP | 2007-538323 | A | 12/2007 |
| JP | 2010-026562 | A | 2/2010 |
| JP | 2011-065243 | A | 3/2011 |
| JP | 2011-233146 | A | 11/2011 |
| JP | 2011-257847 | A | 12/2011 |
| JP | 2012-078893 | A | 4/2012 |
| JP | 2012-104150 | A | 5/2012 |
| JP | 2013-156996 | A | 8/2013 |
| JP | 2014-525624 | A | 9/2014 |
| JP | 2016-507100 | A | 3/2016 |
| JP | 2017-534107 | A | 11/2017 |
| JP | 2017-534967 | A | 11/2017 |
| JP | 2018-503896 | A | 2/2018 |
| JP | 2018-512087 | A | 5/2018 |
| JP | 2018-536213 | A | 12/2018 |
| KR | 10-357850 | B1 | 10/2002 |
| WO | WO 2008/114454 | A1 | 9/2008 |
| WO | WO 2009/137567 | A1 | 11/2009 |
| WO | WO 2012/039834 | A1 | 3/2012 |
| WO | WO 2012/050772 | A1 | 4/2012 |
| WO | WO 2013/106257 | A1 | 7/2013 |
| WO | WO 2015/078394 | A1 | 6/2015 |
| WO | WO 2015/108539 | A1 | 7/2015 |
| WO | WO 2015/149017 | A1 | 10/2015 |
| WO | WO 2016/053950 | A1 | 4/2016 |
| WO | WO 2016/053968 | A1 | 4/2016 |
| WO | WO 2016/053973 | A1 | 4/2016 |
| WO | WO 2016/090292 | A1 | 6/2016 |
| WO | WO 2016/126731 | A1 | 8/2016 |
| WO | WO 2016/164633 | A1 | 10/2016 |
| WO | WO 2016/164638 | A1 | 10/2016 |
| WO | WO 2017/059248 | A1 | 4/2017 |
| WO | WO 2017/112526 | A1 | 6/2017 |
| WO | WO 2017/172440 | A1 | 10/2017 |
| WO | WO 2018/005829 | A1 | 1/2018 |
| WO | WO 2018/039514 | A1 | 1/2018 |
| WO | WO 2018/098443 | A1 | 5/2018 |
| WO | WO 2018/098445 | A1 | 5/2018 |
| WO | WO 2020/005764 | A1 | 1/2020 |
| WO | WO 2020/006081 | A1 | 1/2020 |
| WO | WO 2020/069104 | A1 | 4/2020 |
| WO | WO 2020/123439 | A1 | 6/2020 |
| WO | WO 2020/264431 | A1 | 12/2020 |
| WO | 2021/127577 | A1 | 6/2021 |

(56) References Cited

FOREIGN PATENT DOCUMENTS

WO WO 2021/108435 A1 6/2021
WO WO 2023/107649 A1 6/2023

OTHER PUBLICATIONS

Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.
Anonymous: "alias (command)—Wikipedia," Jun. 28, 2016, pp. 106, XP093089956, Retrieved from the Internet: URL:https://en.wikipedia.org/w/index.php?title=Alias_(command)&oldid=727315645 [retrieved on Oct. 9, 2023.
Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.
Anonymous: "AWS Lambda Developer Guide," Jul. 1, 2021, XP093024770, retrieved from the internet: URL:https://web.archieve.org/web/20210701100128if_/https://docs.aws.amazon.com/lambda/latest/dg/lambda-dg.pdf [retrieved on Feb. 17, 2023] the whole document.
Anonymous: "AWS Lambda Developer Guide," Jul. 1, 2021, XP093024770, retrieved from the internet: URL:https://web.archive.org/web/20210701100128if_/https://docs.aws.amazon.com/lambda/latest/dg/lambda-dg.pdf [retrieved on Feb. 17, 2023] the whole document.
Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].
Anonymous: SaaS Tenant Isolution Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document.
Anonymous: "Security Overview of AWS Lambda," Aug. 11, 2021, XP093030100, retrieved from the internet: URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.
Abebe et al., "EC-Store: Bridging the Gap Between Storage and Latency in Distribute Erasure Coded Systems", IEEE 38th International Conference on Distributed Computing Systems, 2018, pp. 255-266.
Adapter Pattern, Wikipedia, https://en.wikipedia.org/w/index.php?title=Adapter_pattern&oldid=654971255, [retrieved May 26, 2016], 6 pages.
Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.
Amazon, "AWS Lambda: Developer Guide", Apr. 30, 2016 Retrieved from the Internet, URL:https://web.archive.org/web/20160430050158/http://docs.aws.amazon.com:80/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: Jan. 2007, 12 pages.
Bebenita et al., "Trace-Based Compilation in Execution Environments without Interpreters," ACM, Copyright 2010, 10 pages.
Ben-Yehuda et al., "Deconstructing Amazon EC2 Spot Instance Pricing", ACM Transactions on Economics and Computation 1.3, Sep. 2013, 15 pages.
Bhadani et al., Performance evaluation of web servers using central load balancing policy over virtual machines on cloud, Jan. 2010, 4 pages.
Bryan Liston, "Ad Hoc Big Data Processing Made Simple with Serverless Map Reduce", Nov. 4, 2016, Amazon Web Services <https :/laws. amazon .com/bl ogs/compute/ad-hoc-big-data-processi ng-made-si mple-with-serverless-mapred uce >.
CodeChef Admin discussion web page, retrieved from https://discuss.codechef.com/t/what-are-the-memory-limit-and-stack-size-on-codechef/14159, retrieved on Sep. 10, 2019.
CodeChef IDE web page, Code, Compile & Run, retrieved from https://www.codechef.com/ide, retrieved on Sep. 9, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, Nov. 2014, 13 pages.
Deis, Container, Jun. 2014, 1 page.
Dean et al, "MapReduce: Simplified Data Processing on Large Clusters", ACM, 2008, pp. 107-113.
Dombrowski, M., et al., Dynamic Monitor Allocation in the Java Virtual Machine, JTRES '13, Oct. 9-11, 2013, pp. 30-37.
Dornemann et al., "On-Demand Resource Provisioning for BPEL Workflows Using Amazon's ElasticCompute Cloud", 9th IEEE/ACM International Symposium on Cluster Computing and the Grid, 2009, pp. 140-147.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Ekanayake et al, "Twister: A Runtime for Iterative MapReduce", ACM, 2010, pp. 810-818.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Fan et al., Online Optimization of VM Deployment in laaS Cloud, Dec. 17, 2012-Dec. 19, 2012, 6 pages.
Ha et al., A Concurrent Trace-based Just-in-Time Compiler for Single-threaded JavaScript, utexas.edu, Jun. 2009.
Hammoud et al, "Locality-Aware Reduce Task Scheduling for MapReduce", IEEE, 2011, pp. 570-576.
Han et al., Lightweight Resource Scaling for Cloud Applications, May 13, 2012-May 16, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR, va123, 2014.
http://www.codechef.com/ide web page from date Apr. 5, 2015, retrieved using the WayBackMachine, from https://web.archive.org/web/20150405045518/http://www.codechef.com/ide, 2015.
Huang, Zhe, Danny HK Tsang, and James She. "A virtual machine consolidation framework for mapreduce enabled computing clouds." 2012 24th International Teletraffic Congress (ITC 24). IEEE, Sep. 4, 2012-Sep. 7, 2012.
Huang et al., "Erasure Coding in Windows Azure Storege", USENIX, 2012 in 12 pages.
Kamga et al., Extended scheduler for efficient frequency scaling in virtualized systems, Jul. 2012, 8 pages.
IBM, what is Serverless computing, https://www.ibm.com/topics/serverless#:-:test=Serverless%20is%20a%20cloud%20computing,managing%20servers%20or%20backend%20infra-structure, pp. 1-11 (Year: 2023).
Kato, et al. "Web Service Conversion Architecture of the Web Application and Evaluation"; Research Report from Information Processing Society, Apr. 3, 2006 with Machine Translation.

(56) References Cited

OTHER PUBLICATIONS

Kazempour et al., AASH: an asymmetry-aware scheduler for hypervisors, Jul. 2010, 12 pages.
Kim et al, "MRBench: A Benchmark for Map-Reduce Framework", IEEE, 2008, pp. 11-18.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).
Qian, H., and D. Medhi, et al., Estimating Optimal Cost of Allocating Virtualized Resources With Dynamic Demand, ITC 2011, Sep. 2011, pp. 320-321.
Rashmi et al., "EC-Cache: Load-Balance, Low-Latency Cluster Caching with Online Erasure Coding", USENIX, 2016, pp. 401-417.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloudenvironment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en .wikipedia.org/wiki/Recursion_(computer_science), 2015.
Wikipedia: Serverless computing, https://en.wikipedia.org/wiki/Serverless_computing, pp. 107 (Year: 2023).
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
European Examination Report, re EP Application No. 17743108.7, dated Oct. 12, 2022.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.

(56) References Cited

OTHER PUBLICATIONS

International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
International Search Report and Written Opinion mailed Oct. 15, 2019 for International Application No. PCT/US2019/039246 in 16 pages.
International Preliminary Report on Patentability mailed Dec. 29, 2020 for International Application No. PCT/US2019/039246 in 8 pages.
International Search Report for Application No. PCT/US2019/038520 dated Aug. 14, 2019.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Preliminary Report on Patentability for Application No. PCT/US2020/039996 dated Jan. 6, 2022.
International Search Report for Application No. PCT/US2020/062060 dated Mar. 5, 2021.
International Preliminary Report on Patentability for Application No. PCT/US2020/062060 dated Jun. 9, 2022 in 9 pages.
International search Report and written opinion received for PCT application No. PCT/US2024/048187, mailed on Jan. 30, 2025, 9 pages.
International search Report and written opinion received for PCT application No. PCT/US2024/048189, mailed on Jan. 24, 2025, 11 pages.

* cited by examiner

PER-EXECUTION NETWORK BANDWIDTH USE MONITORING IN A SERVERLESS CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

DETAILED DESCRIPTION

Figure 1:
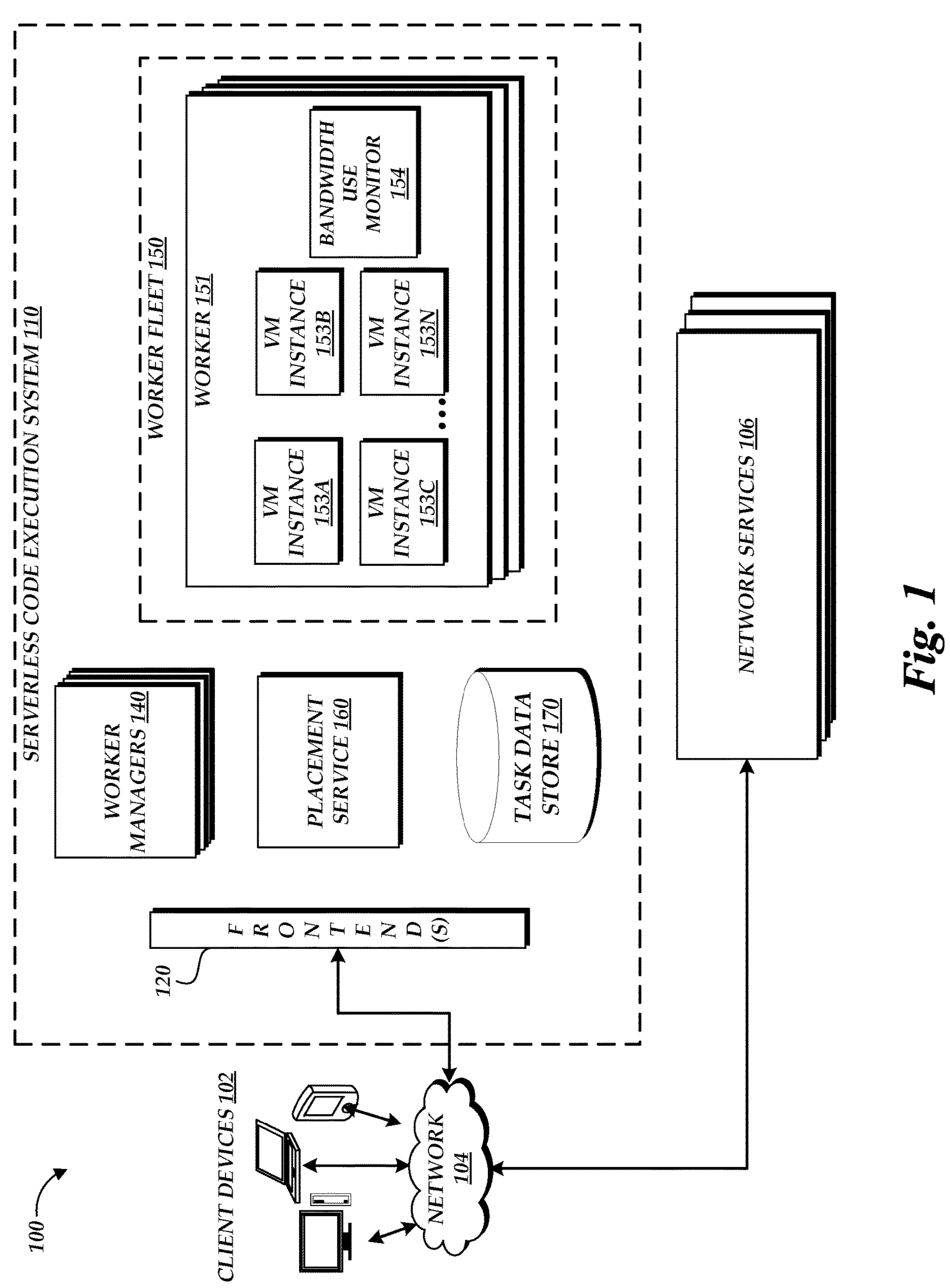
FIG. 1 is a block diagram depicting an illustrative environment in which a serverless code execution system can provide for serverless execution of user-defined code while providing per-execution reporting of network bandwidth use associated with an environment supporting execution of the user-defined code.

Generally described, aspects of the present disclosure relate to determining and reporting per-execution network bandwidth use associated with an environment supporting execution of the user-defined code in a serverless computing environment. Generally described, a serverless computing environment enables on-demand execution of user-specified code without requiring a user to create, configure, or manage an execution environment (such as a virtual machine) on which the code is executed. While removing this need to manage an execution environment may be beneficial to end users in many ways, such as by reducing complexity, increasing an ability to rapidly scale to meet demand, and increasing efficiency, lack of direct access to an execution environment can complicate some aspects of code execution. For example, it may be difficult for an end-user to accurately determine computing resource usage of an execution environment during execution of code, which may complicate tasks such as correctly configuring the environment (e.g., with sufficient but not excessive computing resources), troubleshooting executions (e.g., by determining what type of computing resources are creating a bottleneck to execution), or tracking use of the environment by end-users. Embodiments of the present disclosure address the above-noted problems by providing for tracking computing resource usage of an execution environment supporting serverless code execution. Specifically, embodiments of the present disclosure provide for determining and reporting network bandwidth usage of an execution environment in which a serverless function is executed, addressing the problems noted above and enabling better configuration of and visibility into such environments without requiring end users to directly manage such environments.

As described herein, a serverless code execution system (which may also be referred to as an "on-demand code execution system") enables rapid execution of source code, which may be supplied by users of the on-demand code execution system. For example, a user may submit code in a specific programming language (e.g., the PYTHON™ language) that, when executed, implements network-based processing for a user-facing application (e.g., a mobile device "app"). The serverless code execution system can then enable the user to submit "calls" or "invocations" to execute that code, at which point the system will securely execute the code to provide the desired functionality. Embodiments for providing a serverless code execution system are provided, for example, in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. In brief, an on-demand code execution system can enable client devices to submit executable code (e.g., source code) implementing desired functionality, which functionality is generally referred to herein as a "task" or a "function." The system can further enable a client device to define one or more triggers that result in execution of the code on the system. For example, a client device may request that each time a specific application programming interface (API) call is made, the code should be executed on the serverless code execution system. When a trigger occurs, the serverless code execution system can configure an execution environment for the code, which may correspond to a virtual machine instance, a software container, or other logically isolated environment in which code can execute. The serverless code execution system can then execute the code within the environment, resulting in a task execution. When the task execution completes, the serverless code execution system can remove the environment, thus freeing computing resources for other task executions.

Unlike some other network-based services, a serverless code execution system can remove the need for a user to maintain or configure a computing device, either virtual or physical, to support code execution. Due to this lack of need for a user to maintain a device, serverless code execution systems are referred to as "serverless" (though of course the serverless code execution system itself, as opposed to individual users, may maintain servers to support code execution).

As noted above, the serverless nature of serverless code execution system—in which users are not required to create, configure, or maintain execution environments—can present challenges to various aspects of controlling code execution. Notably, because a serverless code execution can handle selection and configuration of an execution environment in which user-defined code executes, it can be difficult for the user to monitor aspects of the environment, such as consumption of various computing resources. This, in turn, can create difficulties in configuring the environment, troubleshooting code execution, and tracking code execution.

These difficulties may be particularly prevalent under certain uses of a serverless code execution system. For example, one possible use of such a system is by a Software as a Service (SaaS) provider, which provider may act as a user of the serverless code execution system insomuch as the provider utilizes the serverless code execution system to execute provider-specified code, but may also act as a provider to subsequent end-users of the SaaS provider's code. For example, the SaaS provider's code may execute to provide functionality of a web-based or mobile application, which application is used by end users. Thus, the SaaS provider may submit the code to the serverless code execution system such that end users, when accessing the web-based or mobile application, cause execution of the SaaS provider's code on the serverless code execution system. Such providers may have particular need to track resource consumption on a serverless code execution system. For example, providers may wish to ensure fair allocation of resources among their end users. As another example, providers may wish to monitor end user's resource consumption to ensure, for example, that end users are not misusing the code (e.g., to implement malicious functionality). Accordingly, inability to monitor computing resource usage, and particularly network bandwidth usage, can be a significant problem for SaaS providers that use serverless code execution systems.

Embodiments of the present disclosure address these problems by providing for tracking of computing resources used by an execution environment during execution of user-defined code. More specifically, embodiments of the present disclosure enable tracking of network bandwidth usage of the environment during execution of the code. Because each environment can be configured to support a single code execution at a given point in time, bandwidth usage of the environment can be directly attributable to the execution of the code. Accordingly, by reporting or otherwise making visible to users the bandwidth usage of the environment during execution of the code, the above-noted problems related to a lack of visibility as to this usage are addressed.

In one embodiment, monitoring of bandwidth usage is conducted within an execution environment supporting code execution. Illustratively, the execution environment (such as a virtual machine) may execute, within the environment, code that monitors bandwidth usage of the environment. Such code may begin monitoring when execution of code begins, and finish when execution of code halts. The total bandwidth used between those points in time (e.g., as a volume of bytes written out, a volume of bytes read in, or both) may then be reported with respect to that execution, providing visibility as to per-execution bandwidth use of the code.

Additionally or alternatively, the serverless code execution system may monitor per-execution bandwidth use externally to an execution environment. Illustratively, external monitoring may provide additional security, as the execution environment may provide a security boundary that ensures code executing within the environment is unable to modify execution of code outside the environment. Accordingly, monitoring external to an environment may enable more robust reporting (as it is not subject to potential manipulation from user-defined code) while requiring fewer security checks. Moreover, monitoring external to an environment may enable multi-tenanted monitoring, where a single monitor monitors use of multiple environments on a given host computing device (e.g., each associated with a different serverless function). Such multi-tenanted monitoring may reduce computing resource usage associated with implementing monitoring.

In one embodiment, each execution environment is a virtual machine instance hosted on a host computing device. The host computing device can include one or more physical network interfaces that provide access to a network, such as the Internet. The host computing device may further include, for each virtual machine instance, a virtual network interface that is specific to the virtual machine instance, and provides for machine-specific access to the network. To provide for per-execution bandwidth use tracking, the host computing device can include a bandwidth use monitor that responds to instructions to execute code in a given virtual machine instance by reading an initial state of the virtual network interface that is specific to the virtual machine instance. The monitor may further respond to a notification that code execution has completed by reading a later state of the virtual network interface that is specific to the virtual machine instance. Each state may reflect, for example, a current volume of data read in to and written out from the virtual network interface. The monitor may thus calculate a difference between the two states to determine network bandwidth usage associated with the execution. This usage may then be reported by the host computing device along with other information regarding the code execution (e.g., a return value of the execution, output of the execution, etc.). For example, the usage may be included within a response to a network call that requested execution of the code, within logs regarding executions of the code, etc. Accordingly, a user associated with code executions on the serverless code execution system is enabled to view per-execution bandwidth usage for such executions.

Additionally or alternatively to monitoring bandwidth usage, some embodiments of the present disclosure may enable throttling bandwidth usage associated with serverless code executions. For example, a bandwidth monitor associated with an execution environment supporting a serverless code execution (e.g., internal or external to the environment) may be configured to respond to a request to execute code on the environment by throttling a network adapter of the environment to a level associated with the code. Illustratively, a user may specify that a given serverless function—or a given execution of such a function—should be provided with no more than a certain amount of bandwidth (e.g., in bytes per second). According, a bandwidth monitor may be configured to respond to an instruction to execute the function in an environment by applying a throttle to a network adapter of the environment matching the specified bandwidth. Thus, additionally or alternatively to monitoring bandwidth usage, embodiments of the present disclosure can provide for limiting such usage.

As will be appreciated by one of skill in the art in light of the present disclosure, the embodiments disclosed herein improve the ability of computing systems, such serverless code execution systems, to provide on-demand code execution on behalf of users. Moreover, the presently disclosed embodiments address technical problems inherent within computing systems; specifically, the limited visibility into computing resource usage of environments created and managed by serverless code execution systems. These technical problems are addressed by the various technical solutions described herein, including the use of a bandwidth use monitor to monitor, and potentially limit, bandwidth use of an execution environment supporting an execution of a serverless function. Thus, the present disclosure represents an improvement in serverless computing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which embodiments of the present disclosure may be implemented. Specifically, in FIG. 1, client devices 102 may utilize a network 104 to interact with a serverless code execution system 110, to execute serverless functions on the serverless code execution system 110 and monitor bandwidth use of such functions on a per-execution basis.

By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the client devices 102 with one or more user interfaces, command-line interfaces (CLIs), application programing interfaces (APIs), and/or other programmatic interfaces for utilizing services provided by the serverless code execution system 110. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the serverless code execution system 110.

The client devices 102 and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In FIG. 1, users, by way of client computing devices 102, may interact with the serverless code execution system 110 to provide source code, and establish rules or logic defining when and how such code should be executed on the serverless code execution system 110, thus establishing a "task" or "function." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. To avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via client computing devices 102) to provide, request execution of, and view results of computer executable source code. The frontends 120 include a variety of components to enable interaction between the serverless code execution system 110 and other computing devices. For example, each frontend 120 may include a request interface providing client computing devices 102 with the ability to upload or otherwise communication user-specified code and associated data sets to the serverless code execution system 110 (e.g., in the form of a disk image) and to thereafter request execution of that code. In one embodiment, the request interface communicates with external computing devices (e.g., client computing devices 102, network services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a function, an end user may submit (e.g., to a frontend 120) code for the function and associated data to be used to execute the function. In one embodiment, the code is provided in the form of a disk image containing the code and other data that the code may use during execution. Illustratively, creation of a function may result in the frontend 120 creating metadata for the function, which defines for example the user creating the function, the disk image used to facilitate execution of the function, trigger conditions for the function, and the like. In one embodiment, functions may be versioned, with function metadata identifying the available versions and at least some other metadata for a function may vary across versions. For example, different versions may be associated with different disk images. Function data and metadata is illustratively stored in the task data store 170. The task data store 170 correspond to any persistent data store. In one embodiment, the task data store 170 is implemented as logical storage on a cloud storage service, such as an object storage system. An example of such an object storage system is AMAZON™'s SIMPLE STORAGE SERVICE™ (or "S3™") In accordance with embodiments of the present disclosure, user-submitted code may correspond to functions for conducting stream data processing.

After a user has created a function on the serverless code execution system 110, the system 110 may accept calls to execute that function, which may also be referred to as "function invocations." To handle calls to execute a function, the frontend 120 can include an execution queue, which can maintain a record of requested task executions. Illustratively, the number of simultaneous function executions by the serverless code execution system 110 is limited, and as such, new function executions initiated at the serverless code execution system 110 (e.g., via an API call, via a call from an executed or executing function, etc.) may be placed on the execution queue and processed, e.g., in a first-in-first-out order. In some embodiments, the serverless code execution system 110 may include multiple execution queues, such as individual execution queues for each user account. For example, users of the serverless code execution system 110 may desire to limit the rate of function executions on the serverless code execution system 110. Thus, the serverless code execution system 110 may utilize an account-specific execution queue to throttle the rate of simultaneous function executions by a specific user account. In some instances, the serverless code execution system 110 may prioritize function executions, such that function executions of specific accounts or of specified priorities bypass or are prioritized within the execution queue. In other instances, the serverless code execution system 110 may execute functions immediately or substantially immediately after receiving a call for that function, and thus, the execution queue may be omitted.

In addition to functions executed based on explicit user calls and data from network services 106, the serverless code execution system 110 may in some instances operate to trigger execution of functions independently. For example, the serverless code execution system 110 may operate (based on instructions from a user) to trigger execution of a function at each of a number of specified time intervals (e.g., every 10 minutes).

The frontend 120 can further includes an output interface configured to output information regarding the execution of functions on the serverless code execution system 110. Illustratively, the output interface may transmit data regarding function executions (e.g., results of a function, errors related to the function execution, or details of the function execution, such as total time required to complete the execution, total data processed via the execution, etc.) to the client computing devices 102 or to network services 106, which may include, for example, logging services. The output interface may further enable transmission of data, such as service calls, to network services 106. For example, the output interface may be utilized during execution of a function to transmit an API request to a network service 106 (e.g., to store data generated during execution of the function).

Code executions triggered on the serverless code execution system 110 of FIG. 1 are executed by execution environments hosted by a set of workers 151 within a worker fleet 150. Each worker 151 is illustratively a host device configured to host multiple execution environments, which in FIG. 1 are virtual machine instances 153A-N. Execution environments may alternatively include software containers, sometimes referred to as "OS-level virtualization," another virtualization technology known in the art. Thus, where references are made herein to VM instances 153, it should be understood that (unless indication is made to the contrary) a container may be substituted for such instances 153.

As used herein, the term "virtual machine instance" is intended to refer to an execution of software or other executable code that emulates hardware to provide an environment or platform on which software may execute (an "execution environment"). Due to their emulation of hardware, these virtual machine instances are sometimes referred to as "system virtual machines." System virtual machines are different than, for example, process virtual machines that do not emulate hardware. Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As shown in FIG. 1, each worker 151 may host a number of instances 153A-N. Each instance 153 may be isolated from other instances 153, thus ensuring the security of code executions on the serverless code execution system 110. For example, each instance 153 may be divided by a virtualization boundary, by virtue of the instance 153 being a virtual machine hosted by the worker 151. In addition, each instance 153 may exist within a partitioned user space on the worker 151, which logically partitions resources of the worker 151 among instances 153. Each user space may, for example, represent a "chroot" jail—known isolation technique for LINUX™ operating systems.

To facilitate rapid execution of code, each worker 151 may be configured to maintain a set of instances 153 in a "pre-warmed" state, being at least partially configured to begin execution of code. For example, instances may be created on the worker and configured with access to computing resources (CPU, RAM, drive storage, etc.). In some cases, it may be impractical or impossible to maintain instances 153 in a fully warmed state for all possible code executions, as executions may be associated with a wide variety of at least partially distinct data sets (e.g., disk images and/or snapshots). Thus, instances 153 may be maintained in a "greatest commonality" for a given group of tasks, such as being provisioned with a set of computing resources common to those tasks, being configured to accept an operating system type used by those tasks, etc.

On receiving instructions to provision an instance 153 to support execution of the task, the worker 151 may adjust the configuration of the instance 153 to support that execution. Specifically, the worker 151 may provision the instance 153 with access to a disk image or snapshot corresponding to the task. In some instances, the worker 151 may retrieve the disk image for the task and store the full image locally. In other instances, the worker 151 may provide to an instance 153 what appears to be full local access to the disk image or snapshot, while "lazily" retrieving portions of that image or snapshot in response to a request to read such portions. Techniques for providing lazy retrieval of image portions are discussed in the U.S. patent application Ser. No. 17/105,250, filed Nov. 25, 2020 and entitled "LOW LATENCY ACCESS TO DATA SETS USING SHARED DATA SET PORTIONS" (the "'250 Application") the entirety of which is hereby incorporated by reference.

In addition, the system 110 includes a number of components for facilitating distribution of calls to execute a function from frontends 120 to particular VM instances 153. For example, the serverless code execution system 110 includes one or more worker managers 140 configured to manage execution environments (e.g., virtual machine instances) hosted by workers 151 among a worker fleet 150. The worker managers 140—each of which are illustratively implemented as physical or virtual-on-physical devices—illustratively "lease" particular VM instances 153 within the fleet 150, thus gaining operational control to, for example, instruct virtual machine instances 153 to execute code of the function. Thus, on receiving a call to execute a function, a frontend 120 may distribute the call to a worker manager 140, which may identify a currently-leased VM instance 153 in which to implement the function, and cause the instance 153 to implement the function.

In the instance that a worker manager 140 does not currently lease a VM instance 153 corresponding to the called function, the worker manager 140 can contact a placement service 160 to request a lease on an additional instance 153, which is illustratively configured to grant to the worker managers 140 leases to individual VM instances 153. Illustratively, the placement service 160 may maintain state information for VM instances 153 across the fleet 150, as well as information indicating which manager 140 has leased a given instance 153. When a worker manager 140 requests a lease on an additional instance 153, the placement service 160 can identify an appropriate instance 153 (e.g., warmed with software and/or data required to support a call to implement a function) and grant to the manager 140 a lease to that instance 153. In the case that such an instance 153 does not exist, the placement service 160 can instruct a worker 151 to create such an instance 153 (e.g., by creating an instance 153 or identifying an existing unused instance 153, providing the instance 153 with access to a required set of data to support execution, etc.) and thereafter grant to the worker manager 140 a lease to that instance 153, thus facilitating execution. Illustratively, the placement service 160 may attempt to select a worker 151 on which to place an instance 153 based on an expected resource usage of the instance 153 and based on available resources of the worker 151. In accordance with embodiments of the present disclosure, the placement service 160 may also utilize an expected per-invocation bandwidth metric for the instance 153 (e.g., as calculated based on prior tracking of function executions) to select a worker 151.

The illustrative environment 100 further includes one or more network services 106, which can interact with the serverless code execution system 110. Network services 106 can correspond to network-connected computing devices, such as servers, which generate data accessible to the serverless code execution system 110, receive data from code executing on the serverless code execution system 110 or otherwise communicate to the serverless code execution system 110. For example, the network services 106 can include web services (e.g., associated with the client computing devices 102, with the serverless code execution system 110, or with third parties), databases, really simple syndication ("RSS") readers, social networking sites, or any other source of network-accessible service or data source. In some instances, network services 106 may be invoked by code execution on the serverless code execution system 110, such as by API calls to the network services 106.

In accordance with embodiments of the present disclosure, workers 151 within the serverless code execution system 110 can be configured to monitor and/or control bandwidth usage by individual VM instances 153 during execution of a serverless function. Specifically, each worker 151 in FIG. 1 includes a bandwidth use monitor 154 representing code executable to monitor and/or control bandwidth usage by individual VM instances 153. In one embodiment, the bandwidth use monitor 154 is configured to respond to instructions to execute a serverless function in a given VM instance 153 by initializing tracking of network usage by the given VM instance 153, modifying the VM instance 153's access to a network to apply a throttling to such access, or both. In such an embodiment, the bandwidth use monitor 154 is further configured to respond to completion of the execution (e.g., as reported by the VM instance 153) by halting tracking of network usage, removing throttling of network access, or both. The bandwidth use monitor 154 can further be configured to report tracked network bandwidth usage associated with the execution. For example, the bandwidth use monitor 154 may report (e.g., directly or via interaction with a frontend 120) tracked network bandwidth usage to a client device 102 that initiated the execution, to network servers 106 (e.g., as log data associated with the execution), or both. Accordingly, the bandwidth use monitor 154 can provide visibility and control of bandwidth use by individual function execution on a worker 151.

While shown in FIG. 1 as a single, multi-tenanted bandwidth use monitor 154, a monitor 154 may additionally or alternatively be implemented internally to each VM instance 153. For example, each instance 153 may include a distinct monitor 154 specific to that instance 153 that functions in a manner the same as or similar to the external monitor 154 shown in FIG. 1.

The serverless code execution system 110 is depicted in FIG. 1 as operating in a distributed computing environment including several computer systems that are interconnected using one or more computer networks (not shown in FIG. 1), which systems operate to provide the serverless code execution system 110. Illustratively, serverless code execution system 110 includes a number of rapidly provisioned and released computing resources within a hosted computing environment configured to provide serverless code execution system 110. A hosted computing environment may also be referred to as a "cloud computing environment." The serverless code execution system 110 could also operate within a computing environment having a fewer or greater number of devices than are illustrated in FIG. 1. Thus, the depiction of serverless code execution system 110 in FIG. 1 should be taken as illustrative and not limiting to the present disclosure. For example, the elements of the serverless code execution system 110 or various constituents thereof could implement various Web services components and/or peer to peer network configurations to implement at least a portion of the processes described herein. The serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

Figure 2:
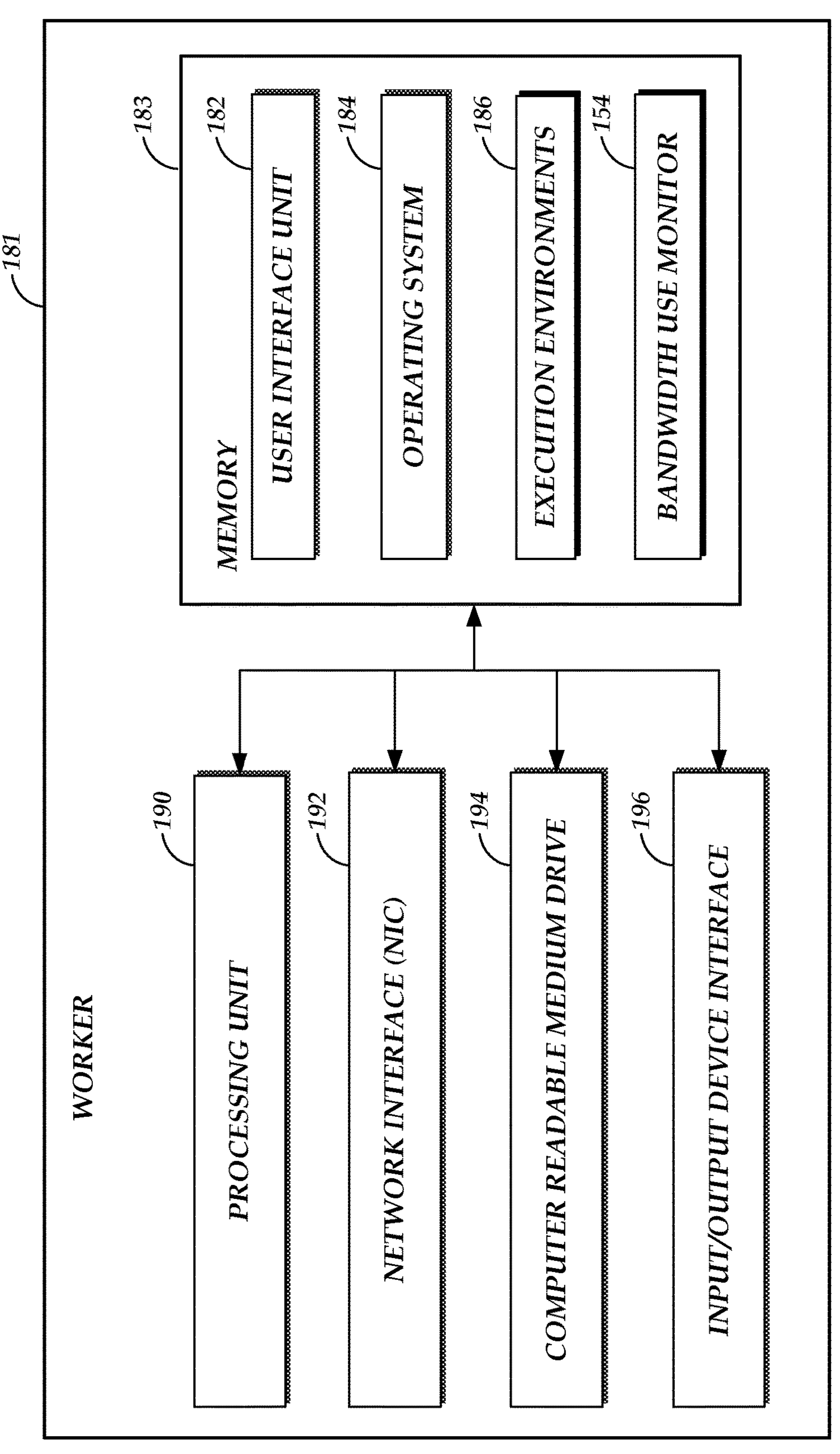
FIG. 2 depicts a general architecture of a computing device providing a worker of the serverless code execution system of FIG. 1 that may provide per-execution reporting of network bandwidth use associated with an environment supporting execution of the user-defined code in accordance with embodiments of the present disclosure.

FIG. 2 depicts a general architecture of a worker 151. The general architecture of the worker 151 depicted in FIG. 2 includes an arrangement of computer hardware and software modules that may be used to implement aspects of the present disclosure. The hardware modules may be implemented with physical electronic devices, as discussed in greater detail below. The worker 151 may include many more (or fewer) elements than those shown in FIG. 2. Additionally, the general architecture illustrated in FIG. 2 may be used to implement one or more of the other components illustrated in FIG. 1.

As illustrated, the worker 151 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 185 and further provide output information for an optional display (not shown) via the input/output device interface 196. The input/output device interface 196 may also accept input from an optional input device (not shown).

As illustrated, the worker 151 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 185 and further provide output information for an optional display (not shown) via the input/output device interface 196. The input/output device interface 196 may also accept input from an optional input device (not shown).

The memory 185 may contain computer program instructions (grouped as modules in some embodiments) that the processing unit 190 executes in order to implement one or more aspects of the present disclosure. The memory 185 generally includes random access memory (RAM), read only memory (ROM) and/or other persistent, auxiliary or non-transitory computer readable media. The memory 185 may store an operating system 184 that provides computer program instructions for use by the processing unit 190 in the general administration and operation of the worker 151. The memory 185 may further include computer program instructions and other information for implementing aspects of the present disclosure. For example, in one embodiment, the memory 185 includes a user interface unit 182 that generates user interfaces (and/or instructions therefor) for display upon a computing device, e.g., via a navigation and/or browsing interface such as a browser or application installed on the computing device. In addition, the memory 185 may include and/or communicate with one or more data repositories (not shown), for example, to access user program codes and/or libraries.

In addition to and/or in combination with the user interface unit 182, the memory 185 may include execution environments 186 and a bandwidth use monitor 154. In one embodiment, the execution environments 186 and bandwidth use monitor 154 individually or collectively implement various aspects of the present disclosure. For example, the execution environments 186 can represent environments, such as containers or virtual machines, in which code corresponding to tasks on a serverless code execution system 110 are executed. The bandwidth use monitor 154 can represent code executable to track bandwidth use of execution environments 186 on a per-execution basis, to limit bandwidth use of environments 186 on a per-execution basis, or both.

While the execution environments 186 and bandwidth use monitor 154 are shown in FIG. 2 as part of worker 151, in other embodiments, all or a portion of the execution environments 186 and bandwidth use monitor 154 may be implemented by other components of the serverless code execution system 110 and/or another computing device. For example, in certain embodiments of the present disclosure, another computing device in communication with the serverless code execution system 110 may include several modules or components that operate similarly to the modules and components illustrated as part of the worker 151.

Figure 3A:
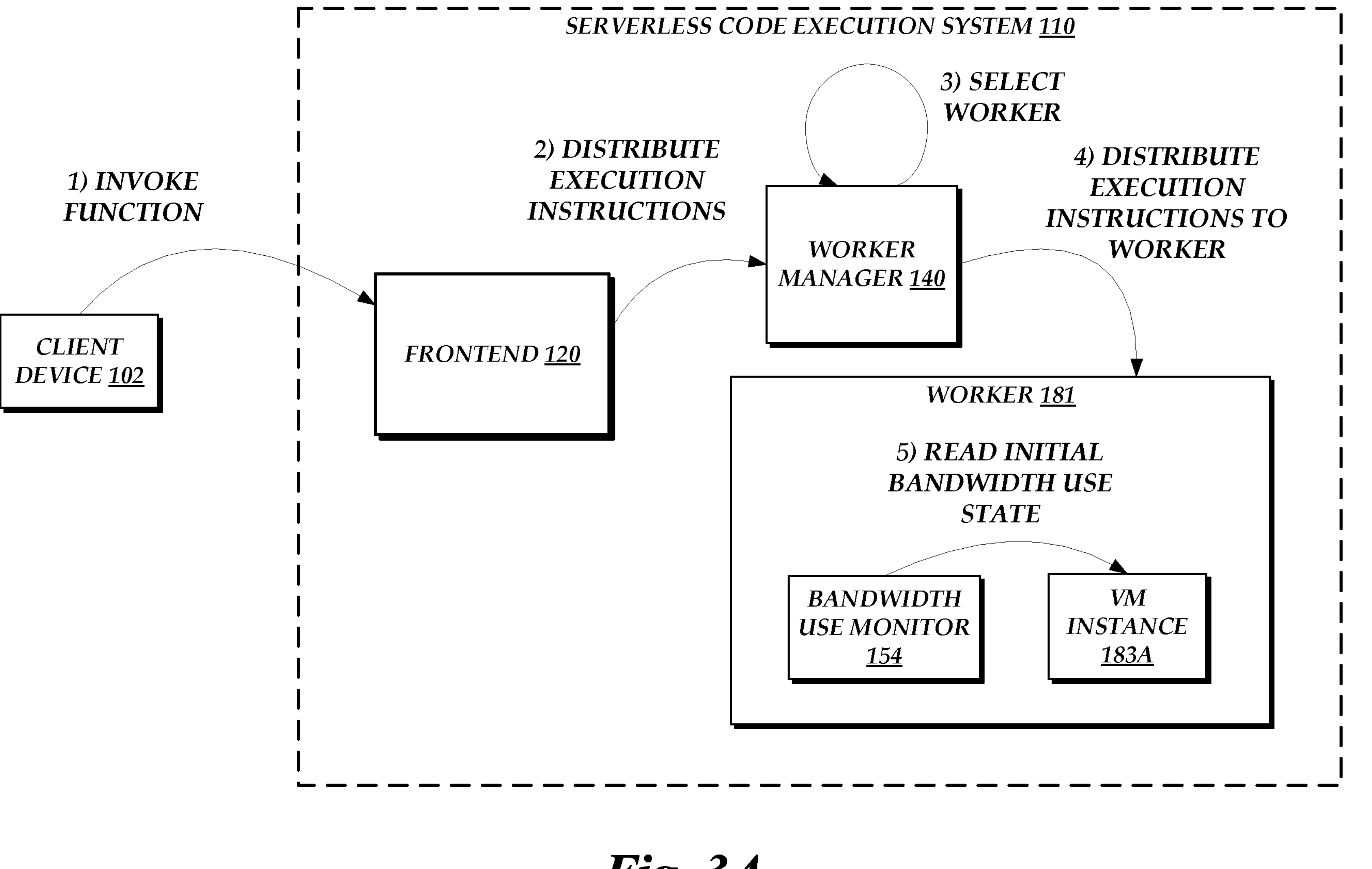
FIG. 3A-3B depict illustrative interactions for executing a serverless function on the serverless code execution system of FIG. 1 and providing per-execution reporting of network bandwidth use associated with an environment supporting execution of the user-defined code.
Figure 3B:
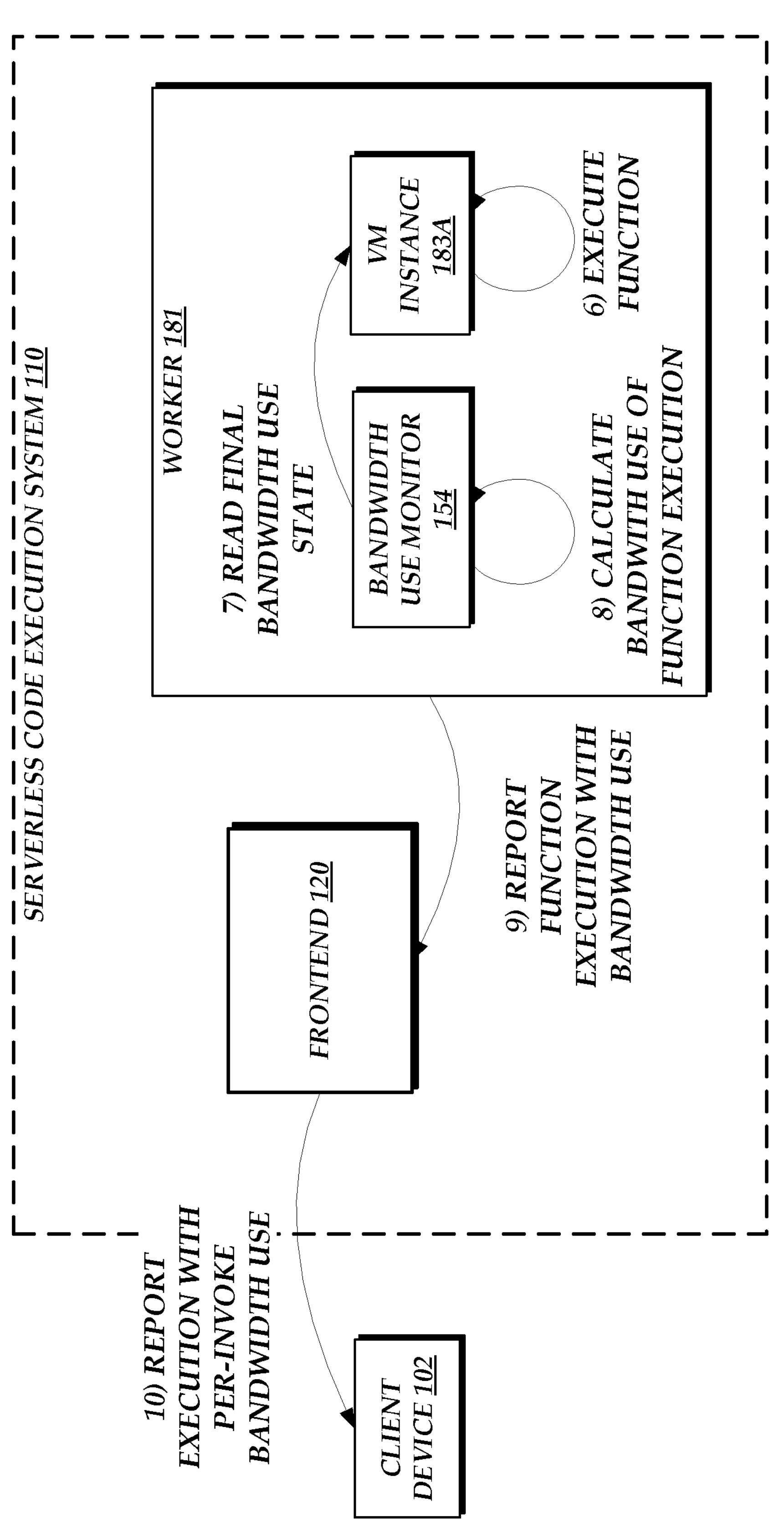

With reference to FIGS. 3A-B, illustrative interactions will be described for monitoring per-execution bandwidth use of a serverless function execution the serverless code execution system 110 of FIG. 1. The interactions of FIG. 3A begin at (1), where a client device 102 transmits a call to the frontend 120 to invoke execution of a serverless function (e.g., a function previously created on the system 110). While FIG. 3A depicts invocation of a serverless function by a client device 102, other devices (such as devices corresponding to network services 160 of FIG. 1 or the frontend 120) may additionally or alternatively invoke execution of a serverless function.

At (2), the frontend 120 distributes execution instructions for the serverless function to a worker manager 140. For example, the frontend 120 may apply load balancing techniques to select a worker manager 140 from a set of worker managers 140 previously associated with the serverless function, or may newly assign a worker manager 140 to handle executions of the serverless function.

At (3), the worker manager 140 selects a worker 181 from the worker fleet 180 to execute the serverless function. Illustratively, the worker manager 140 may maintain a list of execution environments leased to the manager 140, serverless functions associated with each environment, and workers 181 on which the environments exist. The worker manager 140 can then select a particular worker 181 to which to distribute execution instructions for the serverless function. Illustratively, if the manager 140 has an active lease on an environment already associated with the serverless function (e.g., loaded with code and other requisite information for executing the serverless function) and that is idle (e.g., not currently executing another instance of the serverless function), the manager 140 can distribute instructions to the worker 181 hosting that environment to execute the serverless function within the environment. If the manager 140 does not have an active lease on an idle environment associated with the serverless function, the worker 181 can interact with the placement service 160 to obtain a lease to such an environment. As noted above, the placement service 160 can then identify a worker 181 with sufficient capacity to host such an environment, and return a lease to the manager 140 for the environment. The manager 140 (or in some instances the placement server 160) can then instruct a worker 181 hosting the environment to provision the environment for execution of the serverless function, such as by loading code of the serverless function in the environment.

In accordance with embodiments of the present disclosure, it may be beneficial to monitor per-execution (which may also be referred to as "per-invocation") network bandwidth usage of a serverless function, corresponding to per-execution network bandwidth usage of a VM instance 183 on which the function is executed. Accordingly, at (5), a bandwidth use monitor 154 of the worker 181 responds to receipt of the instructions to execute the function by reading an initial bandwidth use state of the VM instance 183A on which the function is to be executed. Illustratively, the initial bandwidth use state may be a current state of a network adapter used by the instance 183A to access the network 104 of FIG. 1, which may for example be a virtual network adapter uniquely associated with the instance 183A (and thus not associated with any other instance 183). Illustratively, where the worker 811 implements a Unix-like operating system, this network adapter may be represented as a file, and reading the initial state may correspond to reading a current state of that file. In one embodiment, the initial state includes a current volume of data associated with the network adapter, such as a current volume of data written to the adapter and a current volume of data read from the adapter.

While FIG. 3A depicts reading of initial bandwidth use state, the bandwidth use monitor 154 may additionally or alternatively initialize tracking of bandwidth use the VM instance 183A (e.g., by initializing tracking of a network interface of the instance 183A). Moreover, while FIG. 3A depicts interactions for bandwidth use tracking, the bandwidth use monitor 154 may implement additional or alternative functions. For example, where a function (or call to a function) is associate with bandwidth limits—such as where function metadata specifies such limits or where such limits are included within the invocation of the task—the bandwidth use monitor 154 may apply such limits during interaction (5). For example, the bandwidth use monitor 154 may modify a configuration of a network adapter of the VM instance 183A to enforce throttling limits (e.g., as a maximum bandwidth in bytes per second available to the adapter).

The interactions of FIG. 3A are continued in FIG. 3B where, at (6), the VM instance 183A executes the serverless function. For example, the instance 183A may pass execution parameters (e.g., included within an invocation) to code of the function to implement functionality corresponding to that code.

In accordance with embodiments of the present disclosure, the function, when executed, may utilize compute resources of the worker, such as network bandwidth (e.g. to the network 104 of FIG. 1). Accordingly at (7), subsequent or responsive to the execution of the serverless function completing within the execution environment 183A, the bandwidth use monitor 154 reads a final bandwidth use state of the VM instance 183A. For example, as noted above, the bandwidth use monitor 154 may read a current state of a network interface reflecting a current amount of bytes read from and written to the interface. In one embodiment, the final state is read by reading a state of a file representing the interface on the worker 181. As noted above, rather than tracking states, the bandwidth use monitor 154 may additionally or alternatively track bandwidth usage directly. Accordingly, interaction (7) may be replaced is such embodiments with finishing tracking of network bandwidth usage of the instance 183A. Moreover, as noted above, the bandwidth use monitor 154 may additionally or alternatively control bandwidth usage of the instance 183A may applying a throttle to a network interface of the instance 183A. Accordingly, interaction (7) may include removing such throttle, such that subsequent executions in the instance 183A (which may not be subject to a throttle) are not throttled.

Thereafter, at (8), the bandwidth use monitor 154 calculates network bandwidth use of the VM instance 183A during execution of the function. For example, the bandwidth use monitor 154 may determine a difference between the final and initial state, such as by subtracting values (e.g., bytes in, byes out) of the initial state from corresponding values of the final state. This difference (e.g., as bytes in and bytes out) can then reflect bandwidth usage of the instance 183A during function execution, thus also reflecting bandwidth usage of the function execution. Alternatively, the bandwidth use monitor 154 may calculate bandwidth usage by directly determining bandwidth usage observed during tracking.

At (9), the bandwidth use monitor 154 reports completion of the function execution to the frontend 120, which in turn reports the completion to the client device 102. In accordance with embodiments of the present disclosure, the data reported at (9) and (10) includes the network bandwidth use calculated at (8), and thus reflects bandwidth use of the function execution. While FIG. 3B depicts bandwidth use being reported to a client device 102, such use may additionally or alternatively be reported to other destinations. For example, such use may be reported to a logging service provided by network services 106, such that a client device 102 can later read bandwidth use from logs provided by the network services 106.

Figure 4:
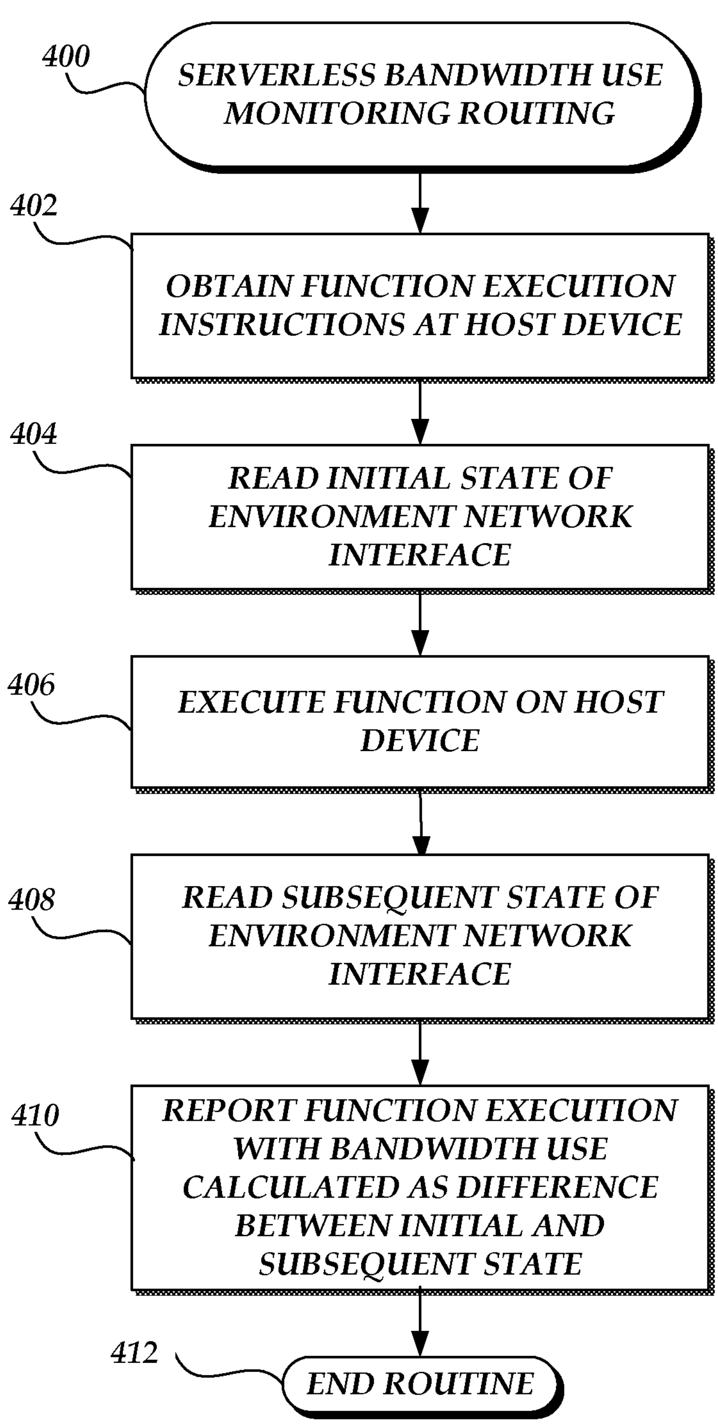
FIG. 4 is a flow chart depicting an illustrative routine for executing function code in a serverless computing environment and providing per-execution reporting of network bandwidth use associated with an environment supporting execution of the user-defined code.

With reference to FIG. 4, an illustrative routine 400 will be described for monitoring network bandwidth usage of a serverless function execution in accordance with embodiments of the present disclosure. The routine 400 may be carried out, for example, by a worker 181 of the serverless code execution system 110 of FIG. 1 (e.g., via execution of a bandwidth use monitor 154).

The routine 400 begins at block 402, where the worker (acting as a host device) obtains instructions to execute a serverless function corresponding to user-defined code. The instruction may be provided, for example, by a worker manager 140 subsequent to receiving an invocation of the function at a frontend 120 (e.g., from a client device 102). The instructions illustratively identify an execution environment of the worker 181 on which to execute the function; alternatively, the worker 181 may select such an environment. As noted above, the environment may be, for example, a virtual machine instance, a software container, or other virtualized environment. The execution environment is illustratively configured to support a single concurrent function execution.

Thereafter, at block 404, the worker 181 reads an initial bandwidth use value of a network interface associated with the execution environment. Illustratively, the worker 181 may include a set of virtual network interfaces (e.g., supported by underlying physical network interfaces) with a one-to-one correspondence to environments of the worker 181. Accordingly, the worker 181 may identify the particular virtual network interface corresponding to the execution environment. Where the worker 181 executes a Unix-like operation system that represents devices as files, the worker 181 may read a current state of a file corresponding to an interface of the execution environment. In one embodiment, monitoring occurs externally to the environment, and the worker 181 thus reads a state of the file outside of the execution environment. In another embodiment, monitoring occurs internally to the environment, and thus the worker 181 reads a state of the interface by execution of code within the environment. Where monitoring occurs externally, the worker 181 may associate a unique identifier of an execution (e.g., an "invocation identifier") with the state of the interface to assist in disambiguation of recorded state. Additionally or alternatively to recording an initial state, the worker 181 may directly track bandwidth use across an interface (e.g., by use of a network analyzer, packet sniffer, etc.). Accordingly, block 404 may be replaced by initialization of direct tracking on the interface.

At block 406, the worker 181 executes code of the function within the environment. Accordingly, the worker 181 may implement any of a wide variety of user-defined functions encoded within the code. During code execution, computing resources of the worker 181 may be utilized to support code execution. For example, the code may read from or write to a network (e.g., network 104) via the network interface discussed above. Such use of the network interface may change a state of the interface (e.g., by increasing bytes read from or written to the interface). Moreover, such use of the network interface may result in traffic that is tracked by the worker 181 (e.g., intercepted or detected at a network analyzer).

At block 408, subsequent or responsive to the execution of the serverless function completing, the worker 181 reads a subsequent state of the network interface of the execution environment. Reading of the subsequent state may occur similarly to reading of the initial state as discussed above with respect to block 404 (e.g., by reading from a file representing the interface or otherwise collecting data indicating bytes read from or written to the interface, by execution of code either internal or external to the environment). As noted above, additionally or alternatively to use of recorded states, the worker 181 may directly track bandwidth use across an interface (e.g., by use of a network analyzer, packet sniffer, etc.). Accordingly, block 408 may in some embodiments be replaced by halting of direct tracking on the interface subsequent or responsive to the execution of the serverless function completing.

Thereafter, at block 410, the worker 181 reports execution of the function with a network bandwidth use value for the execution, as calculated based on a difference between the initial and subsequent states. As noted above, each state may reflect one or more bandwidth use values for a network interface corresponding to an execution environment of the serverless function (e.g., as a total number of bytes, as bytes read from the interface, bytes written to the interface, etc.). Accordingly, a difference in each corresponding value can be used to indicate bandwidth use of the environment, and in turn bandwidth use of the function execution. For example, if an interface initially had written 10 megabytes in total, and subsequent to execution had written 15 megabytes, the worker 181 may calculate the difference (5 megabytes) and report that difference as the total number of byes written to the interface. Similar calculations may occur for other values (e.g., total bytes, bytes read from the interface, etc.). As noted above, additionally or alternatively to use of recorded states, the worker 181 may directly track bandwidth use across an interface (e.g., by use of a network analyzer, packet sniffer, etc.). Accordingly, block 410 may in some embodiments be replaced by reporting the function execution along with one or more directly-tracked bandwidth usage values (e.g., bytes observed being read from or written to the interface). The report may be directed, for example, to a client device 102 or to logging services (e.g., as network services 106) accessible to a client device 102.

Accordingly, implementation of the routine 400 enables the network bandwidth use of an individual function execution on a serverless computing environment to be tracked and surfaced to users, such that the users can correctly configure serverless functions, troubleshoot such functions, monitor execution of such functions, and the like.

While FIG. 4 depicts illustrative blocks of the routine 400, additions or other modifications to the routine 400 are possible. Illustratively, the routine 400 may be modified to additionally or alternatively provide for throttling network bandwidth of a serverless function, such as by establishing a throttle (e.g., as pre-defined for a function or invocation, as specified in an invocation, etc.) at block 404 (which may be removed at block 408). Additionally, the serverless code execution system 110 may in some instances support alerting of setting errors that contribute to significant, unintended network traffic. For example, the worker 181 may be configured to detect abnormal bandwidth use (e.g., above a given threshold) during a function execution and to report such bandwidth at block 410.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A serverless code execution system to report network bandwidth use associated with individual function executions on the serverless code execution system, the system comprising:

a host computing device providing:

an execution environment provisioned with code corresponding to a serverless function, and a network interface providing network access to the execution environment, wherein the host computing device is configured to:

obtain a request to execute the serverless function on the serverless code execution system;

select the execution environment to host execution of the serverless function;

determine a bandwidth throttle for the execution of the serverless function;

prior to executing the code within the execution environment, read an initial state of the network interface, wherein the initial state is an absolute amount of data associated with the network interface providing network access to the execution environment at a first time, and modify the network interface to enforce the bandwidth throttle;

initiate an execution of the serverless function within the execution environment;

subsequent to the execution of the serverless function within the execution environment, read a subsequent state of the network interface, wherein the subsequent state is an absolute amount of data associated with the network interface providing access to the execution environment at a second time, and modify the network interface to remove the bandwidth throttle;

determine bandwidth use associated with the execution of the serverless function based at least partly on a difference between the absolute amount of data at the first time and the absolute amount of data at the second time; and transmit an execution result for the execution of the serverless function, wherein the execution result includes the bandwidth use associated with the execution of the serverless function.

2. The serverless code execution system of claim 1, wherein the execution environment is at least one of a virtual machine instance or a software container.

3. The serverless code execution system of claim 1, wherein the network interface is a virtual network interface associated with only the execution environment.

4. The serverless code execution system of claim 1, wherein the bandwidth use comprises a number of bytes read from the network interface and a number of bytes written to the network interface.

5. A computer-implemented method comprising:

obtaining a request to execute code on a serverless code execution system;

selecting an execution environment on the serverless code execution system in which to execute the code;

determining a bandwidth throttle for the execution of the code;

prior to executing the code within the execution environment, reading an initial state of a network interface of the execution environment, wherein the initial state reflects a volume of data associated with the network interface providing network access to the execution environment at a first time, and modifying the network interface to enforce the bandwidth throttle;

initiating an execution of the code within the execution environment;

subsequent to the execution of the code within the execution environment, reading a subsequent state of the network interface of the execution environment, wherein the subsequent state reflects a volume of data associated with the network interface providing network access to the execution environment at a second time, and modifying the network interface to remove the bandwidth throttle; and transmitting an execution result for the execution of the code, wherein the execution result includes a bandwidth use of the execution environment associated with the execution of the code, the bandwidth use calculated based at least on a difference between the volume of data at the first time and the volume of data at the second time.

6. The computer-implemented method of claim 5, wherein reading an initial state of a network interface of the execution environment comprises reading a state of a file representing the network interface in an operating system of a host computing device hosting the execution environment.

7. The computer-implemented method of claim 5, wherein reading an initial state of a network interface of the execution environment comprises reading a state of the network interface from within the execution environment.

8. The computer-implemented method of claim 5, wherein transmitting the execution result comprises transmitting the execution result to a logging system within a log reflecting the execution of the code.

9. The computer-implemented method of claim 5, wherein transmitting the execution result comprises transmitting the execution result to a client device that provides the request to execute code.

10. The computer-implemented method of claim 5, wherein the bandwidth throttle is determined based at least in part on a source of the request to execute code.

11. The computer-implemented method of claim 5, wherein the bandwidth throttle is determined based at least in part on a configuration of a serverless function corresponding to the code.

12. The computer-implemented method of claim 5, wherein the bandwidth throttle is determined based at least in part on at least one of a source of the request to execute code or a configuration of a serverless function corresponding to the code.

13. The computer-implemented method of claim 5, wherein reading the initial state and the subsequent state of the network interface is performed by a multi-tenanted bandwidth use monitor external to the execution environment that is configured to monitor bandwidth use of multiple execution environments on a host computing device.

14. The computer-implemented method of claim 5, wherein the request to execute code includes a bandwidth throttle value, and determining the bandwidth throttle comprises using the bandwidth throttle value specified in the request to execute code.

15. One or more non-transitory computer-readable media comprising computer-executable instructions that, when executed by a serverless code execution system, causes the serverless code execution system to:

obtain a request to execute code on the serverless code execution system;

select an execution environment on the serverless code execution system in which to execute the code;

determine a bandwidth throttle for the execution of the code;

prior to executing the code within the execution environment, read an initial state of a network interface of the execution environment, wherein the initial state reflects a volume of data associated with the network interface providing network access to the execution environment at a first time, and modify the network interface to enforce the bandwidth throttle;

initiate an execution of the code within the execution environment;

subsequent to the execution of the code within the execution environment, read a subsequent state of the network interface of the execution environment, wherein the subsequent state reflects a volume of data associated with the network interface providing network access to the execution environment at a second time, and modify the network interface to remove the bandwidth throttle; and transmit an execution result for the execution of the code, wherein the execution result includes a bandwidth use of the execution environment associated with the execution of the code, the bandwidth use calculated based at least on a difference between the total volume of data at the first time and the total volume of data at the second time.

16. The one or more non-transitory computer-readable media of claim 15, wherein to initiate tracking of bandwidth use by the network interface, the computer-executable instructions cause the serverless code execution system to initiate a network analyzer, wherein to finish tracking of bandwidth use of the network interface of the execution environment, the computer-executable instructions cause the serverless code execution system to halt the network analyzer, and wherein the bandwidth use is calculated based at least on one or both of: a difference between the volume of data at the first time and the volume of data at the second time, and an amount of traffic observed by the network analyzer.

17. The one or more non-transitory computer-readable media of claim 15, wherein transmitting the execution result comprises transmitting the execution result to a logging system within a log reflecting the execution of the code.

18. The one or more non-transitory computer-readable media of claim 15, wherein transmitting the execution result comprises transmitting the execution result to a client device that provides the request to execute code.

19. The one or more non-transitory computer-readable media of claim 15, wherein the computer-executable instructions further cause the serverless code execution system to detect abnormal bandwidth use during the execution that exceeds a threshold and to include, in the execution result, an alert indicating the abnormal bandwidth use.

20. The one or more non-transitory computer-readable media of claim 15, wherein selecting the execution environment comprises selecting a worker based at least in part on an expected per-invocation bandwidth metric for the execution environment calculated from prior function executions.

* * * * *